United States Patent
Fang et al.

(10) Patent No.: US 10,015,001 B2
(45) Date of Patent: Jul. 3, 2018

(54) METHOD AND APPARATUS FOR TRANSMITTING AND RECEIVING SYSTEM INFORMATION

(71) Applicant: ZTE CORPORATION, Shenzhen, Guangdong Province (CN)

(72) Inventors: Huiying Fang, Shenzhen (CN); Bo Dai, Shenzhen (CN); Jing Shi, Shenzhen (CN); Shuqiang Xia, Shenzhen (CN); Lijie Wu, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/111,753

(22) PCT Filed: Jul. 9, 2014

(86) PCT No.: PCT/CN2014/000667
§ 371 (c)(1),
(2) Date: Jul. 14, 2016

(87) PCT Pub. No.: WO2015/106371
PCT Pub. Date: Jul. 23, 2015

(65) Prior Publication Data
US 2016/0337106 A1    Nov. 17, 2016

(30) Foreign Application Priority Data
Jan. 16, 2014 (CN) .......................... 2014 1 0020980

(51) Int. Cl.
*H04L 5/00* (2006.01)
*H04W 48/12* (2009.01)
(Continued)

(52) U.S. Cl.
CPC .......... *H04L 5/0091* (2013.01); *H04L 5/0053* (2013.01); *H04L 5/0082* (2013.01);
(Continued)

(58) Field of Classification Search
None
See application file for complete search history.

(56) References Cited

U.S. PATENT DOCUMENTS

| | | | | |
|---|---|---|---|---|
| 2011/0270984 A1* | 11/2011 | Park | ......................... | H04W 4/00 709/225 |
| 2014/0169272 A1* | 6/2014 | Shieh | .................... | H04W 4/005 370/328 |
| 2015/0359003 A1* | 12/2015 | Kim | .................. | H04W 74/0833 370/336 |

FOREIGN PATENT DOCUMENTS

| | | |
|---|---|---|
| CN | 102170641 A | 8/2011 |
| CN | 102316535 A | 1/2012 |

(Continued)

OTHER PUBLICATIONS

International Search Report and Written Opinion dated Oct. 24, 2014 in PCT Application No. PCT/CN2014/000667.
"3rd Generation Partnership Project; Technical Specification Group Radio Access Network; Study on provision of low-cost MTC UES based on LTE; (Release 12)," 3GPP Draft; R1-132798, 3GPP TR 36.888 V2.1.0, Retrived on Jul. 17, 2013 at http://www.3gpp.org/ftp/tsg_ran/WG3_lu/TSGR3_81/LSin/.
ZTE: "Diminishing returns and coverage improvement summary for TR36.888," 3GPP TSG RAN WG1 Meeting #73, Fukuoka, Japan, May 20-24, 2013, R1-132110.
European Search Report dated Oct. 17, 2016 in Application No. EP 14878608.0.

Primary Examiner — Anh Ngoc Nguyen
(74) Attorney, Agent, or Firm — Plumsea Law Group, LLC

(57) ABSTRACT

Disclosed are a method and an apparatus for transmitting and receiving system information. The method for transmitting comprises: determining a system information repetition transmission resource area within a system information scheduling period, wherein the system information repetition transmission resource area comprises resource elements for repetitively transmitting the system information; and the receiving method comprises: a terminal detecting system information within a system information scheduling period, wherein the system information is system information transmitted on a broadcast channel and system information transmitted on a system information repetition transmission resource area, the system information repetition transmis- (Continued)

sion resource area comprises resource elements for repetitively transmitting the system information.

26 Claims, 13 Drawing Sheets

(51) Int. Cl.
*H04L 27/20* (2006.01)
*H04L 5/14* (2006.01)

(52) U.S. Cl.
CPC ........... *H04L 27/206* (2013.01); *H04W 48/12* (2013.01); *H04L 5/0094* (2013.01); *H04L 5/14* (2013.01); *H04Q 2213/13215* (2013.01)

(56) References Cited

FOREIGN PATENT DOCUMENTS

| | | |
|---|---|---|
| CN | 103220691 A | 7/2013 |
| CN | 103220795 A | 7/2013 |
| EP | 2945454 A1 | 11/2015 |
| WO | 2011014728 A2 | 2/2011 |

* cited by examiner

METHOD AND APPARATUS FOR TRANSMITTING AND RECEIVING SYSTEM INFORMATION

CROSS-REFERENCE TO RELATED APPLICATION(S)

This application is the U.S. National Phase application of PCT application number PCT/CN2014/000667 having a PCT filing date of Jul. 9, 2014, which claims priority of Chinese patent application 201410020980.1 filed on Jan. 16, 2014, the disclosures of which are hereby incorporated by reference.

TECHNICAL FIELD

The present document relates to the field of communication, in particular to a method and an apparatus for transmitting and receiving system information in an enhanced manner.

BACKGROUND OF RELATED ART

MTC UE (MTC User Equipment) is also called as an M2M user communication device, and is a main application form of Internet of Things at the present stage. Low power consumption and low cost are important guarantees for massive application thereof. Smart metering device is one of the most typical applications of the MTC device. Most smart metering MTC device is fixedly installed in low-coverage-performance environments such as basements. In order to guarantee that the MTC device can keep normal communication with a base station system, usually additional devices such as sites and relays need to be deployed, and undoubtedly this will greatly increase the deployment cost of operators. For this reason, companies such as Vodafone put forward a demand of improving smart metering MTC device coverage on the premise of not increasing the deployment of additional devices.

Smart metering MTC device mainly transmits small-packet data, has low requirement on data rate and can tolerate greater data transmission delay. Since the requirement of the smart metering MTC device on the data rate is extremely low, for data channels, the correct transmission of the small-packet data can be guaranteed by means of lower modulation and coding rate and repetitively transmitting for many times in time domain and so on. However, for system frame number information which needs to be transmitted to a terminal, the frame number information in the existing LTE system is contained in an MIB (Master Information Block) for transmission, a scheduling period for transmitting the MIB is 40 ms, the MIB is transmitted for four times on a broadcast channel on a sub-frame 0 of each radio frame within 40 ms, as shown in FIG. 1, respectively as system information coding block 1, system information coding block 2, system information coding block 3 and system information coding block 4, each system information coding block carries complete MIB information and can be independently decoded. MIB message within every 40 ms is kept unchanged and an SFN (System Frame Number) in next MIB message will be changed. In order to improve the coverage performance of the MTC terminal and guarantee that the device can normally communicate with the base station system, the times for transmitting the MIB need to be increased within 40 ms scheduling period. Besides, for some traditional user terminals under the low-coverage environment, the times for transmitting the system information also need to be increased to guarantee that the terminal equipment can normally maintain communication with the base station system.

At present, there is no solution for coding and resource mapping modes of the system information transmitted in an enhanced manner, and thus an enhanced transmission solution of system information needs to be designed aiming at a duplex mode and sub-frame configuration, so as to guarantee that the user terminal can correctly receive corresponding system information.

SUMMARY

The embodiments of the present document provide a method and an apparatus for transmitting and receiving system information, and solve the problem of how to guarantee the normal communication between equipment and a base station.

A method for transmitting system information, comprises:
determining a system information repetition transmission resource area within a system information scheduling period, wherein the system information repetition transmission resource area comprises resource elements for repetitively transmitting the system information.

Preferably, within a system information scheduling period, sub-frame resources corresponding to the system information repetition transmission resource area within the system information scheduling period are configured according to any one or more of follows:
the system information repetition transmission resource area being on a sub-frame 0 of a radio frame;
the system information repetition transmission resource area being on a sub-frame 0 of a radio frame and a sub-frame 5 of a radio frame with a system frame number being odd; and
the system information repetition transmission resource area being on a sub-frame 0 of a radio frame and N other sub-frames of the radio frame, N≥1 and N<10.

Preferably, the system information repetition transmission resource area consists of one or more system information repetition transmission resource area blocks, one system information repetition transmission resource area block consists of M continuous OFDM (Orthogonal Frequency Division Multiplexing) symbols in time domain and comprises 72 subcarriers in frequency domain, M≥1 and M≤7.

Preferably, the system information repetition transmission resource area does not comprise resource areas occupied by a physical downlink control channel and broadcast channel and a synchronizing signal within a sub-frame, wherein the resource area occupied by the physical downlink control channel is on first four OFDM symbols, or first three OFDM symbols or first two OFDM symbols of a sub-frame.

Preferably, after the step of determining a system information repetition transmission resource area within a system information scheduling period, the method further comprises:
a base station determining according to a predefined transmission mode or dynamically determining whether to transmit the repetitively-transmitted system information within the system information scheduling period.

Preferably, the method further comprises:
within a frame number transmission period, predefining repetitively transmitting system information within one or more system information scheduling periods as the predefined transmission mode.

Preferably, the method further comprises: when determining to transmit the repetitively-transmitted system information within a current system information scheduling period, performing coding, rate matching, scrambling and modulation on the system information, and mapping the system information obtained after the coding, rate matching, scrambling and modulation to available resource elements of the system information repetition transmission resource area within the system information scheduling period to transmit.

Preferably, the available resource elements of the system information repetition transmission resource area refer to resource elements except resource elements for transmitting Cell-specific Reference Signals (CRSs) in the system information repetition transmission resource area.

Preferably, the system information refers to Master Information Block (MIB) or Advanced Master Information Block (Advanced-MIB) plus Cyclic Redundancy Check (CRC), wherein a length of the MIB is 24 bits and a length of the CRC is 16 bits.

Preferably, the coding, rate matching, scrambling, modulation and mapping are performed within one system information scheduling period.

Preferably, the step of performing coding, rate matching, scrambling and modulation on the system information, and mapping the system information obtained after the coding, rate matching, scrambling and modulation to available resource elements of the system information repetition transmission resource area within the system information scheduling period to transmit comprises:

determining a coding bit length of the repetitively-transmitted system information after rate matching according to a total number of available resource elements in all system information repetition transmission resource areas within the system information scheduling period, and performing coding on the repetitively-transmitted system information;

performing rate matching on the repetitively-transmitted system information after coding;

performing scrambling and modulation on the repetitively-transmitted system information after rate matching, wherein a scrambling length is equal to the coding bit length of the repetitively-transmitted system information after rate matching; and mapping the repetitively-transmitted system information after modulation to available resource elements in all system information repetition transmission resource areas within the system information scheduling period.

Preferably, mapping the repetitively-transmitted system information after modulation to available resource elements in all system information repetition transmission resource areas within the system information scheduling period comprises:

firstly mapping the repetitively-transmitted system information after modulation to all available resource elements corresponding to a first symbol in a first repetition transmission resource area within the system information scheduling period according to a sequence of first frequency domain and then time domain, and then sequentially mapping the repetitively-transmitted system information after modulation to all available resource elements corresponding to a next symbol in the first repetition transmission resource area till mapping to all repetition transmission resource areas is completed.

Preferably, the coding, rate matching, scrambling, modulation and mapping are performed within one radio frame of the system information scheduling period.

Preferably, performing coding, rate matching, scrambling and modulation on the system information, and mapping the system information obtained after the coding, rate matching, scrambling and modulation to available resource elements of the system information repetition transmission resource area within the system information scheduling period to transmit comprises:

determining a coding bit length of the repetitively-transmitted system information after rate matching within the radio frame according to a total number of available resource elements in all system information repetition transmission resource area blocks within each radio frame, and performing coding on the repetitively-transmitted system information;

performing rate matching on the repetitively-transmitted system information after coding;

performing scrambling and modulation on the repetitively-transmitted system information after rate matching, wherein a scrambling length is equal to the coding bit length of the repetitively-transmitted system information after rate matching within the radio frame; and within a radio frame, mapping the repetitively-transmitted system information after modulation to available resource elements in all system information repetition transmission resource area blocks within the current radio frame to transmit.

Preferably, within a radio frame, mapping the repetitively-transmitted system information after modulation to available resource elements in all system information repetition transmission resource area blocks within the current radio frame to transmit comprises:

firstly mapping the repetitively-transmitted system information after modulation to all available resource elements corresponding to a first symbol in a first repetition transmission resource area block within the radio frame according to a sequence of first frequency domain and then time domain, and then sequentially mapping the repetitively-transmitted system information after modulation to all available resource elements corresponding to a next symbol in the first repetition transmission resource area till mapping to all repetition transmission resource areas is completed.

Preferably, mapping the system information obtained after the coding, rate matching, scrambling and modulation to available resource elements of the system information repetition transmission resource area within the system information scheduling period to transmit comprises:

mapping a system information coding block transmitted on a broadcast channel to the system information repetition transmission resource area to transmit.

Preferably, the method further comprises:

determining a mapping mode according to whether the system information repetition transmission resource contains CRSs.

Preferably, determining a mapping mode according to whether the system information repetition transmission resource contains CRSs comprises:

selecting and mapping system information coding blocks transmitted on broadcast channel resource symbols containing the CRSs to resource elements corresponding to symbols containing the CRSs in the system information repetition transmission resource area blocks; and selecting and mapping system information coding blocks transmitted on broadcast channel resource symbols not containing the CRSs to resource elements corresponding to symbols not containing the CRSs in the system information repetition transmission resource area blocks.

A method for receiving system information, comprises:

a terminal detecting system information within a system information scheduling period, wherein the system information is system information transmitted on a broadcast channel and system information transmitted on a system information repetition transmission resource area, the system information repetition transmission resource area comprises resource elements for repetitively transmitting the system information.

Preferably, within a system information scheduling period, sub-frame resources corresponding to the system information repetition transmission resource area within the system information scheduling period are configured according to any one or more of follows:

the system information repetition transmission resource area being on a sub-frame 0 of a radio frame;

the system information repetition transmission resource area being on a sub-frame 0 of a radio frame and a sub-frame 5 of a radio frame with a system frame number being odd; and the system information repetition transmission resource area being on a sub-frame 0 of a radio frame and N other sub-frames of the radio frame, N≥1 and N<10.

Preferably, the system information repetition transmission resource area consists of one or more system information repetition transmission resource area blocks, one system information repetition transmission resource area block consists of M continuous Orthogonal Frequency Division Multiplexing (OFDM) symbols in time domain and comprises 72 subcarriers in frequency domain, M≥1 and M≤7.

Preferably, the system information repetition transmission resource area does not comprise resource areas occupied by a physical downlink control channel and broadcast channel and a synchronizing signal within a sub-frame, wherein the resource area occupied by the physical downlink control channel is on first four OFDM symbols, or first three OFDM symbols or first two OFDM symbols of a sub-frame.

Preferably, available resource elements of the system information repetition transmission resource area refer to resource elements except resource elements for transmitting Cell-specific Reference Signals (CRSs) in the system information repetition transmission resource area.

Preferably, the system information refers to Master Information Block (MIB) or Advanced Master Information Block (Advanced-MIB) plus Cyclic Redundancy Check (CRC), wherein a length of the MIB is 24 bits and a length of the CRC is 16 bits.

Preferably, after the step of a terminal detecting system information within a system information scheduling period, the method further comprises:

the terminal performing demodulation and descrambling on the system information transmitted on the system information repetition transmission resource area.

Preferably, the terminal performs demodulation and descrambling on the system information transmitted on the system information repetition transmission resource area by using one system information scheduling period as a unit.

Preferably, the step of the terminal performing demodulation and descrambling on the system information transmitted on the system information repetition transmission resource area comprises:

determining a coding bit length and performing demodulation on the repetitively-transmitted system information, wherein the coding bit length of the repetitively-transmitted system information is determined according to a total number of available resource elements in all system information repetition transmission resource areas within one system information scheduling period; and performing descrambling on the repetitively-transmitted system information after demodulation, wherein a scrambling length is equal to the coding bit length of the repetitively-transmitted system information after rate matching.

Preferably, the terminal performs demodulation and descrambling on the system information transmitted on the system information repetition transmission resource area within a single radio frame by using one radio frame period as a unit.

Preferably, the terminal performing demodulation and descrambling on the system information transmitted on the system information repetition transmission resource area within a single radio frame by using one radio frame period as a unit comprises:

determining a coding bit length and performing demodulation on the repetitively-transmitted system information, wherein the coding bit length of the repetitively-transmitted system information is determined according to a total number of available resource elements in all system information repetition transmission resource areas within one radio frame; and performing descrambling on the repetitively-transmitted system information after demodulation, wherein a scrambling length is equal to the coding bit length of the repetitively-transmitted system information after rate matching.

Preferably, the terminal performing demodulation and descrambling on the system information transmitted on the system information repetition transmission resource area comprises:

the terminal performing demodulation and descrambling on the repetitively-transmitted system information received on symbols in the system information repetition transmission resource area, at this moment, the repetitively-transmitted system information received on the system information repetition transmission resource area coming from a system information coding block transmitted on a broadcast channel, wherein the repetitively-transmitted system information received on resource elements corresponding to symbols containing CRSs in the system information repetition transmission resource area blocks is the same as system information coding block information received on at least one broadcast channel resource symbol containing the CRSs, and the repetitively-transmitted system information received on resource elements corresponding to symbols not containing the CRSs in the system information repetition transmission resource area blocks is the same as system information coding block information received on at least one broadcast channel resource symbol not containing the CRSs.

Preferably, after the step of the terminal performing demodulation and descrambling on the system information transmitted on the system information repetition transmission resource area, the method further comprises:

the terminal performing joint decoding on the system information received on the broadcast channel and the system information received on the system information repetition transmission resource area.

An apparatus for transmitting system information comprises:

a repetition transmission resource allocation module configured to determine a system information repetition transmission resource area within a system information scheduling period, wherein the system information repetition transmission resource area comprises resource blocks for repetitively transmitting the system information.

Preferably, the apparatus further comprises:

a transmission determination module configured to determine according to a predefined transmission mode or dynamically determine whether to transmit the repetitively-transmitted system information within the system information scheduling period.

Preferably, the apparatus further comprises:

a predefining module configured to, within a frame number transmission period, predefine repetitively transmitting system information within one or more system information scheduling periods as the predefined transmission mode.

Preferably, the apparatus further comprises:

a transmission execution module configured to, when determining to transmit the repetitively-transmitted system information within a current system information scheduling period, perform coding, rate matching, scrambling and modulation on the system information, and map the system information obtained after the coding, rate matching, scrambling and modulation to available resource elements of the system information repetition transmission resource area within the system information scheduling period to transmit.

An apparatus for receiving system information comprises:

a repetition transmission system information detection module configured to detect system information within a system information scheduling period, wherein the system information is system information transmitted on a broadcast channel and system information transmitted on a system information repetition transmission resource area, the system information repetition transmission resource area comprises resource blocks for repetitively transmitting the system information.

Preferably, the apparatus further comprises:

a receiving module configured to perform demodulation and descrambling on the system information transmitted on the system information repetition transmission resource area.

The embodiment of the present document further provides a computer program comprising program instructions, which, when executed by a base station, enable the base station to execute the method for transmitting system information.

The embodiment of the present document further provides a computer program comprising program instructions, which, when executed by a terminal, enable the terminal to execute the method for receiving system information.

The embodiment of the present document further provides a carrier carrying any one of the above computer programs.

The embodiments of the present document provide a method and an apparatus for transmitting and receiving system information, wherein a base station determines a system information repetition transmission resource area within a system information scheduling period, the system information repetition transmission resource area comprises resource elements for repetitively transmitting the system information, and a terminal detects system information within each system information scheduling period. By configuring the resources for repetitively transmitting the system information, repetitively-transmitting of the system information between the base station and the terminal is realized and the problem of how to guarantee the normal communication between the equipment and the base station is solved.

PREFERRED EMBODIMENTS

At present, there is no solution for coding and resource mapping modes of system information transmitted in an enhanced manner, and thus an enhanced transmission solution of system information needs to be designed aiming at a duplex mode and sub-frame configuration, so as to guarantee that a user terminal can correctly receive corresponding system information.

In order to solve the problem, the embodiments of the present document provide a method and an apparatus for transmitting system information. The embodiments of the present document will be described below in detail in combination with the drawings. It needs to be stated that the embodiments in the present application and the features in the embodiments can be freely combined under the situation of no conflict.

Embodiment 1

This embodiment of the present document provides a method for transmitting system information. This embodiment of the present document describes system information transmission in detail by adopting a method for transmitting system information in an enhanced manner provided by this embodiment of the present document under Frequency division Duplexing (FDD) and Time Division Duplexing (TDD) systems, wherein the situation that a downlink control channel occupies three OFDM symbols is taken as an example.

Figure 1:
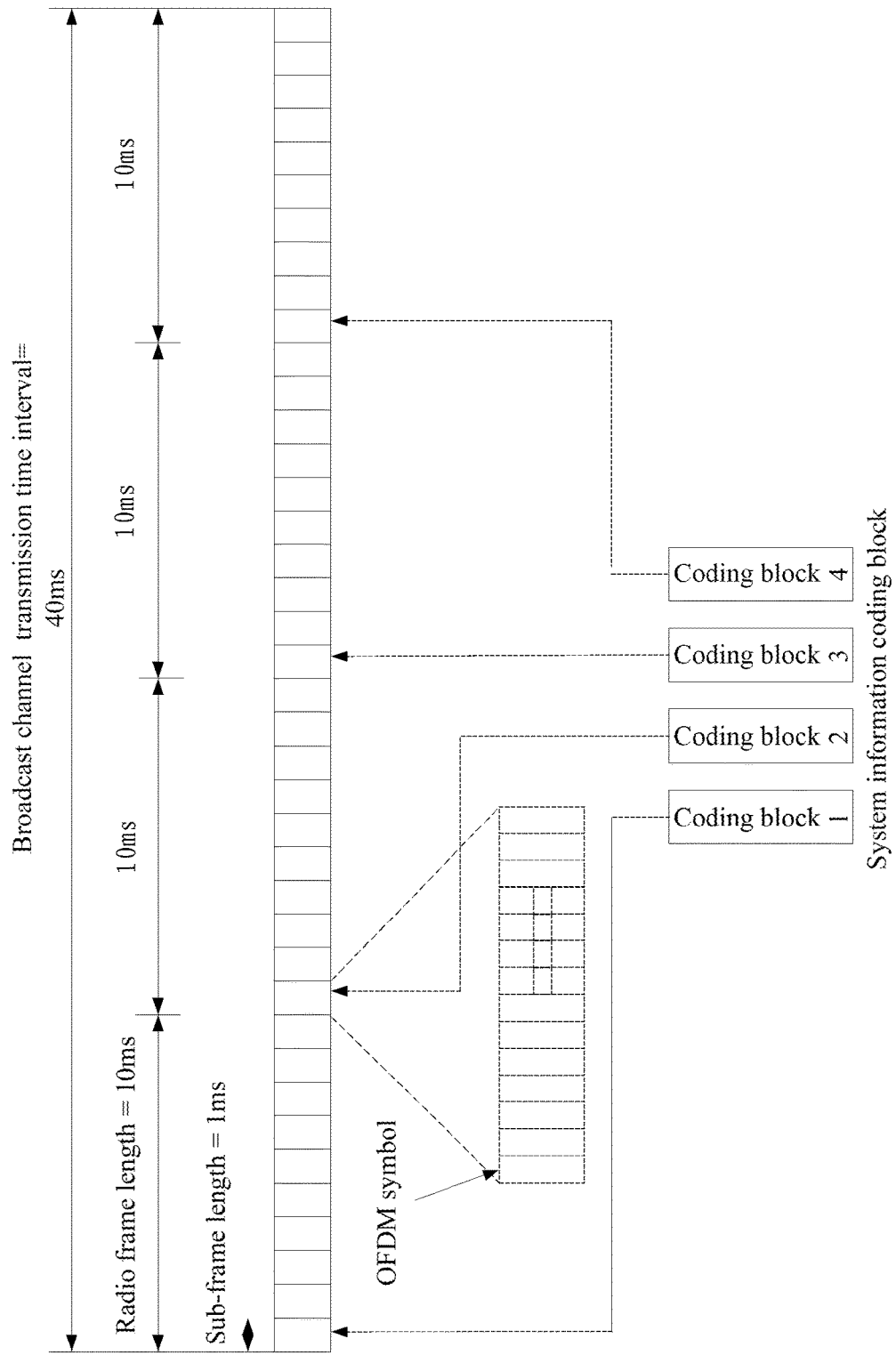
FIG. 1 a schematic diagram of scheduling of MIB information in an LTE system.
Figure 2:
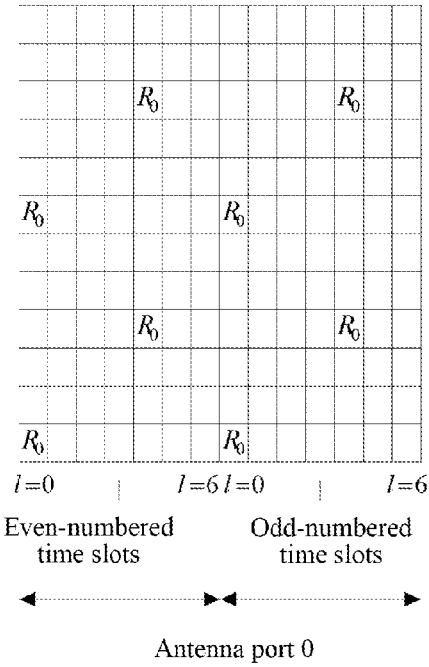
FIG. 2 is a distribution diagram of a cell-specific reference signal in a Physical Resource Block (PRB) in an LTE system.
Figure 2:
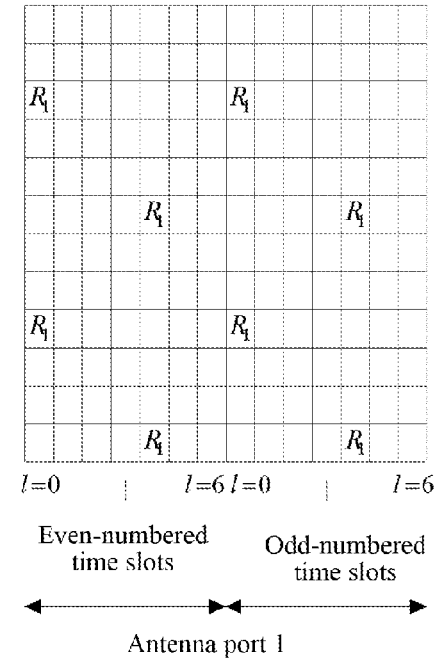
Figure 2:
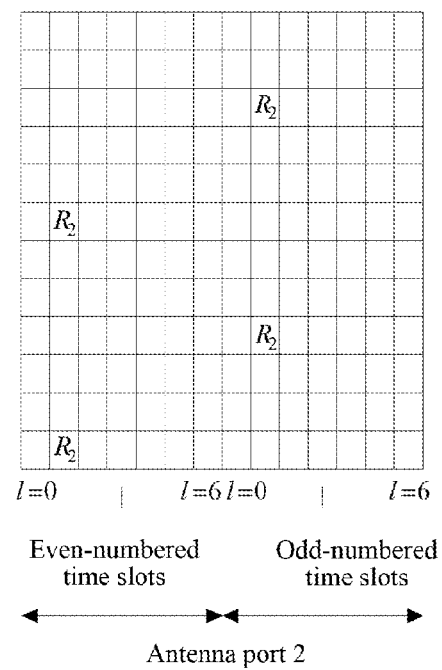
Figure 2:
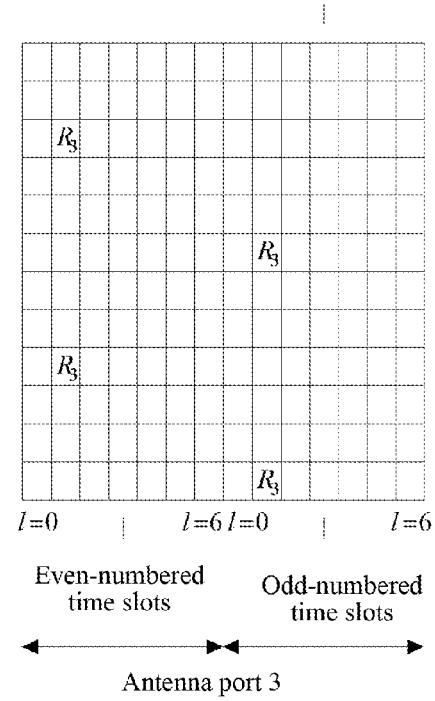
Figure 3:
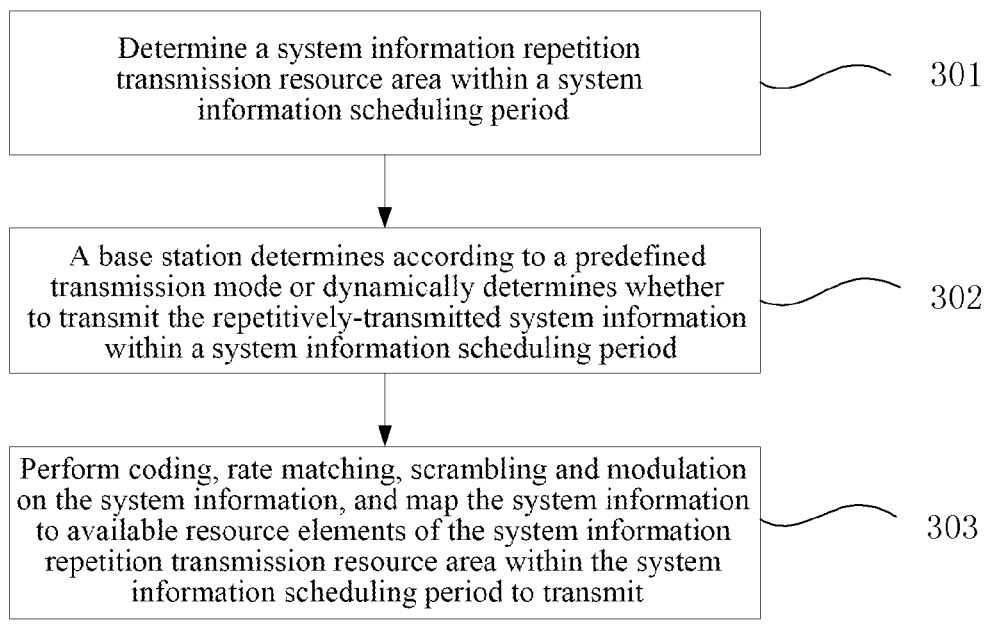
FIG. 3 is a base-station-side processing flowchart of a method for transmitting system information provided by embodiment 1 of the present document.
Figure 5:
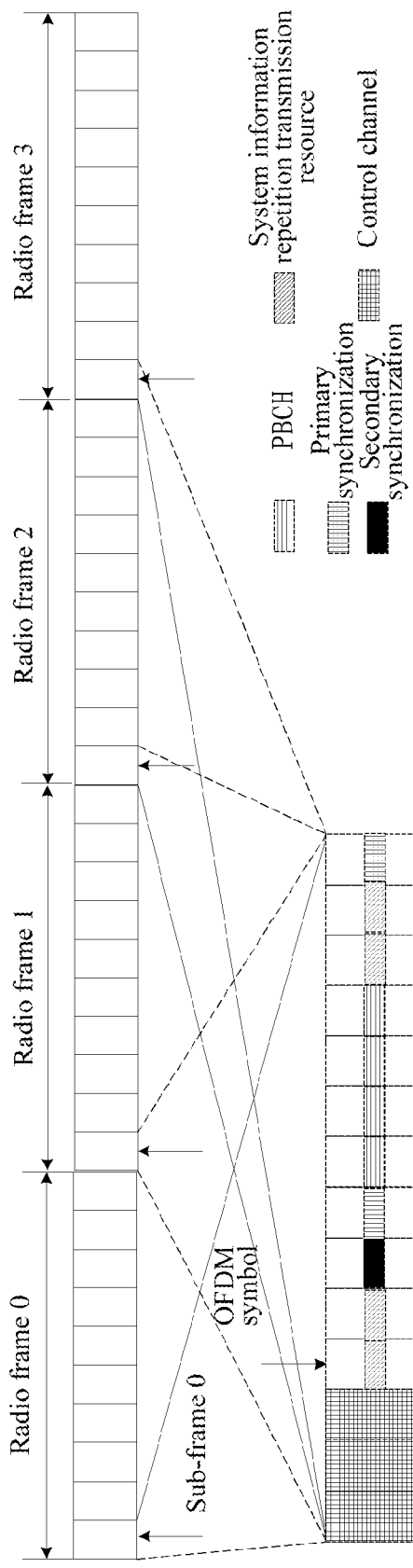
FIG. 5 is a schematic diagram of a system information repetition transmission resource area under FDD and TDD systems.
Figure 5:
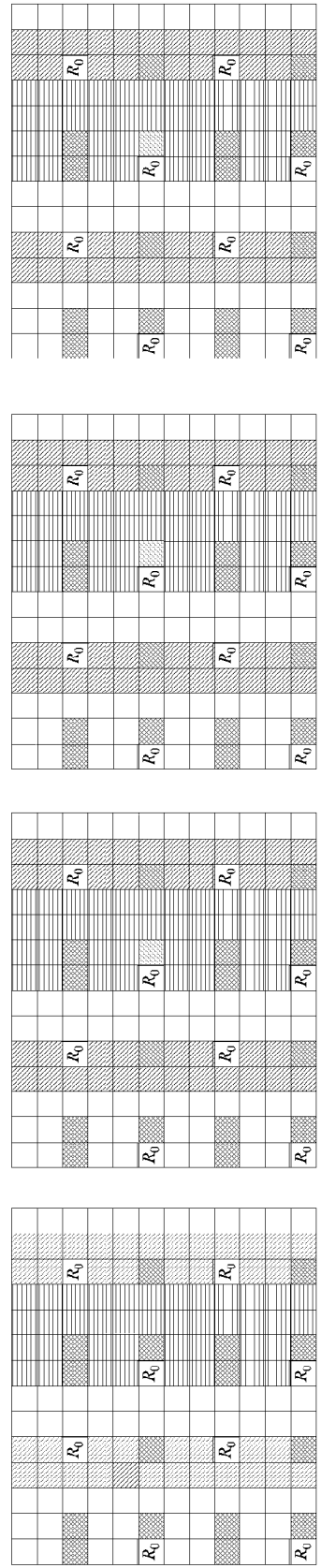
Figure 6:
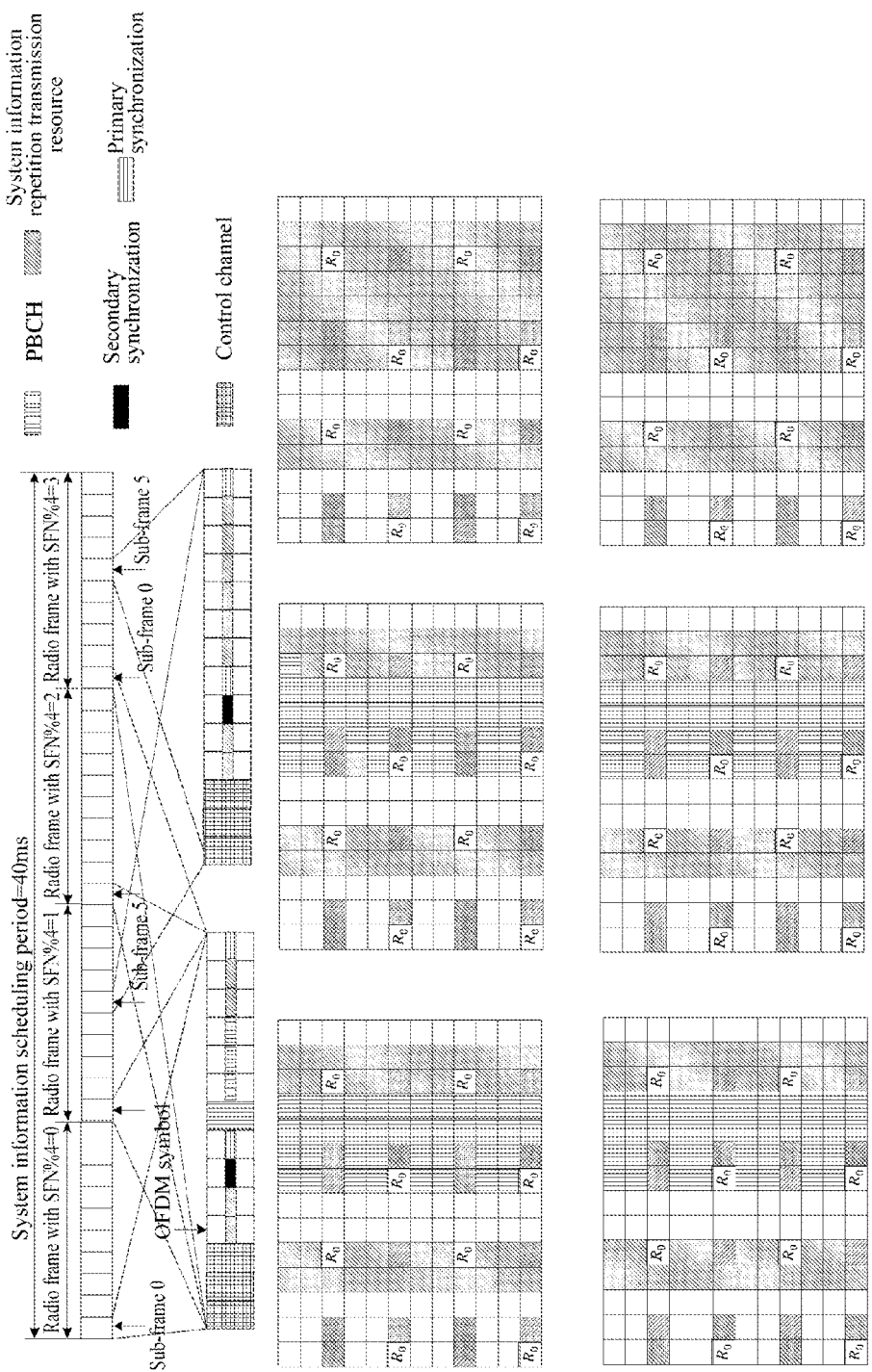
FIG. 6 is a schematic diagram of another system information repetition transmission resource area under FDD and TDD systems.
Figure 7:
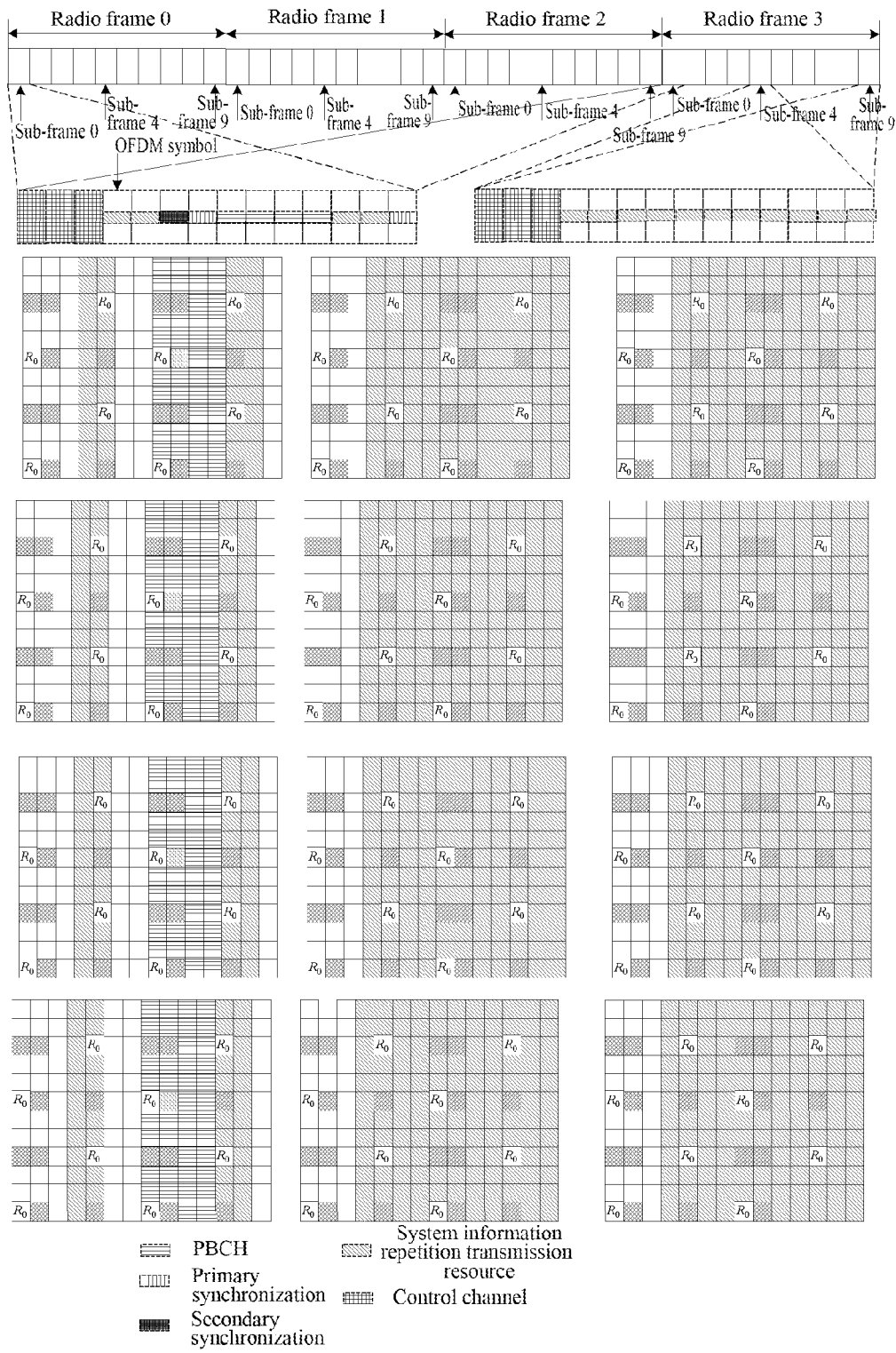
FIG. 7 is a schematic diagram of another system information repetition transmission resource area under FDD and TDD systems.

Base-station-side processing steps, as shown in FIG. 3, comprise:

At Step 301, it is to determine a system information repetition transmission resource area within a system information scheduling period. The system information repetition transmission resource area comprises resource elements for repetitively transmitting the system information. The system information repetition transmission resource area consists of one or more system information repetition transmission resource area blocks, one system information repetition transmission resource area block consists of M continuous OFDM symbols in time domain and comprises 72 subcarriers in frequency domain, M≥1 and M≤7. Within a system information scheduling period, the system information repetition transmission resource area is on a sub-frame 0 of a radio frame. As shown in FIG. 5, the system information repetition transmission resource area comprises the system information repetition transmission resource area block on the 4th and 5th symbols of the first time slot and the system information repetition transmission resource area block on the last 2nd and 3rd symbols of the second time slot, on the sub-frame 0 of the radio frame. Or, within a system information scheduling period, the system information repetition transmission resource area is on a sub-frame 0 of a radio frame and a sub-frame 5 of a radio frame with SFN %4=1 or 3. As shown in FIG. 6, the system information repetition transmission resource area comprises the system information repetition transmission resource area block on the 4th and 5th symbols of the first time slot and the system information repetition transmission resource area block on the last 2nd and 3rd symbols of a second time slot on the sub-frame 0 of the radio frame, and the system information repetition transmission resource area block on the 4th and 5th symbols of the first time slot and the system information repetition transmission resource area block on the 1st, 2nd, 3rd, 4th, 5th and 6th symbols of the second time slot on a sub-frame 5 of the radio frame with SFN$4=1 or 3. Or, within a system information scheduling period, the system information repetition transmission resource area is on a sub-frame 0 of a radio frame and N other sub-frames of the radio frame, N≥1 and N<10. As shown in FIG. 7, the system information repetition transmission resource area comprises the system information repetition transmission resource area block on the 4th and 5th symbols of the first time slot and the system information repetition transmission resource area block on the last 2nd and 3rd symbols of a second time slot on the sub-frame 0 of the radio frame, and the system information repetition transmission resource area blocks on symbols except first three symbols of the first time slot on a sub-frame 4 and a sub-frame 9 of the radio frame.

At Step 302, a base station determines according to a predefined transmission mode or dynamically determines whether to transmit the repetitively-transmitted system information within a system information scheduling period. The predefined transmission mode refers to a mode for predefining that the repetitively-transmitted system information is transmitted in which system information scheduling periods in a frame number transmission period (the length of 1024 radio frames).

At Step 303, it is to perform coding, rate matching, scrambling and modulation on the system information, and map the system information to available resource elements of the system information repetition transmission resource area within the system information scheduling period to transmit. Available resource elements of the system information repetition transmission resource area refer to resource elements except resource elements for transmitting Cell-specific Reference Signals (CRSs) in the system information repetition transmission resource area. The system information refers to Master Information Block (MIB) or Advanced Master Information Block (Advanced-MIB) plus Cyclic Redundancy Check (CRC), wherein the length of the MIB is 24 bits and the length of the CRC is 16 bits. The following three modes are mainly included:

303-a: it is to perform the coding, rate matching, scrambling, modulation and mapping within one system information scheduling period; and determine a coding bit length of the repetitively-transmitted system information after rate matching according to the total number of available resource elements in all system information repetition transmission resource areas within the one system information scheduling period. As shown in FIG. 5, the total number of available resource elements in all system information repetition transmission resource areas within one system information scheduling period is 960, QPSK modulation is adopted for repetitive transmission of the system information and the coding bit length of the repetitively-transmitted system information after rate matching is 1920 bits. As shown in FIG. 6, the total number of available resource elements in all system information repetition transmission resource areas within one system information scheduling period is 1902, QPSK modulation is adopted for repetitive transmission of the system information and the coding bit length of the repetitively-transmitted system information after rate matching is 3840 bits. As shown in FIG. 7, the total number of available resource elements in all system information repetition transmission resource areas within one system information scheduling period is 5568, QPSK modulation is adopted for repetitive transmission of the system information and the coding bit length of the repetitively-transmitted system information after rate matching is 11136 bits. The scrambling length is equal to the coding bit length of the repetitively-transmitted system information after rate matching. After scrambling and modulation, coding bits of the repetitively-transmitted system information after rate matching are mapped to available resource elements in all system information repetition transmission resource areas within the system information scheduling period. According to a sequence of first frequency domain and then time domain, the repetitively-transmitted system information after modulation is firstly mapped to all available resource elements corresponding to the first symbol in the first repetition transmission resource area block within the system information scheduling period, then is sequentially mapped to all available resource elements corresponding to a next symbol in the first repetition transmission resource area block, and then is mapped to a next repetition transmission resource area block, and so on.

303-b: it is to perform the coding, rate matching, scrambling, modulation and mapping within one radio frame; and determine a coding bit length of the repetitively-transmitted system information after rate matching according to the total number of available resource elements in all system information repetition transmission resource area blocks within the one radio frame. As shown in FIG. 5, the total number of available resource elements within the radio frame is 240, QPSK modulation is adopted for repetitive transmission of the system information and the coding bit length of the repetitively-transmitted system information after rate matching is 480 bits. As shown in FIG. 6, the total number of available resource elements within the radio frame with SFN %4=0 or 2 is 240, QPSK modulation is adopted for repetitive transmission of the system information and the coding bit length of the repetitively-transmitted system information after rate matching is 480 bits; and the total number of available resource elements within the radio frame with SFN %4=1 or 3 is 720, QPSK modulation is adopted for repetitive transmission of the system information and the coding bit length of the repetitively-transmitted system information after rate matching is 1440 bits. As shown in FIG. 7, the total number of available resource elements in all system information repetition transmission resource areas within the radio frame is 1392, QPSK modulation is adopted for repetitive transmission of the system information and the coding bit length of the repetitively-transmitted system information after rate matching is 2784 bits. The scrambling length is equal to the coding bit length of the repetitively-transmitted system information after rate matching. After scrambling and modulation, coding bits of the repetitively-transmitted system information after rate matching are mapped to available resource elements in all system information repetition transmission resource areas within the corresponding radio frame. According to a sequence of firstly frequency domain and then time domain, the repetitively-transmitted system information after modulation is firstly mapped to all available resource elements corresponding to the first symbol in the first repetition transmission resource area block within the corresponding radio frame, then is sequentially mapped to all available resource elements corresponding to a next symbol in the first repetition transmission resource area block, and then is mapped to a next repetition transmission resource area block, and so on.

303-c: it is to perform the coding, rate matching, scrambling and mapping, and map a system information coding block transmitted on a broadcast channel to the system information repetition transmission resource area. A mapping mode is determined according to whether a symbol in a system information repetition transmission resource contains CRSs. Therein, system information coding blocks transmitted on broadcast channel resource symbols containing the CRSs are selected and mapped to resource elements corresponding to symbols containing the CRSs in the system information repetition transmission resource area blocks. System information coding blocks transmitted on broadcast channel resource symbols not containing the CRSs are selected and mapped to resource elements corresponding to symbols not containing the CRSs in the system information repetition transmission resource area blocks.

Figure 4:
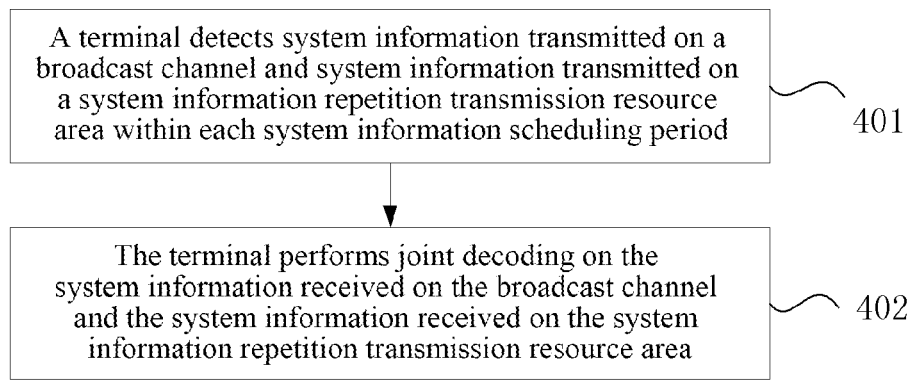
FIG. 4 is a terminal-side processing flowchart of a method for transmitting system information provided by embodiment 1 of the present document.

Terminal-side processing steps, as shown in FIG. 4, comprise:

At Step 401, a terminal detects system information within a system information scheduling period, wherein the system information is system information transmitted on a broadcast channel and system information transmitted on a system information repetition transmission resource area. The system information repetition transmission resource area consists of one or more system information repetition transmission resource area blocks, one system information repetition transmission resource area block consists of M continuous OFDM symbols in time domain and comprises 72 subcarriers in frequency domain, M≥1 and M≤7. Within a system information scheduling period, the system information repetition transmission resource area is on a sub-frame 0 of a radio frame. As shown in FIG. 5, the system information repetition transmission resource area comprises the system information repetition transmission resource area block on the 4th and 5th symbols of the first time slot and the system information repetition transmission resource area block on the last 2nd and 3rd symbols of the second time slot on the sub-frame 0 of the radio frame. Or, within a system information scheduling period, the system information repetition transmission resource area is on a sub-frame 0 of a radio frame and a sub-frame 5 of a radio frame with SFN %4=1 or 3. As shown in FIG. 6, the system information repetition transmission resource area comprises the system information repetition transmission resource area block on the 4th and 5th symbols of the first time slot and the system information repetition transmission resource area block on the last 2nd and 3rd symbols of the second time slot on the sub-frame 0 of the radio frame, and the system information repetition transmission resource area block on the 4th and 5th symbols of the first time slot and the system information repetition transmission resource area block on the 1st, 2nd, 3rd, 4th, 5th and 6th symbols of the second time slot on a sub-frame 5 of the radio frame with SFN$4=1 or 3. Or, within a system information scheduling period, the system information repetition transmission resource area is on a sub-frame 0 of a radio frame and N other sub-frames of the radio frame, N≥1 and N<10. As shown in FIG. 7, the system information repetition transmission resource area comprises the system information repetition transmission resource area block on the 4th and 5th symbols of the first time slot and the system information repetition transmission resource area block on the last 2nd and 3rd symbols of the second time slot on the sub-frame 0 of the radio frame, and the system information repetition transmission resource area blocks on symbols except first three symbols of the first time slot on a sub-frame 4 and a sub-frame 9 of the radio frame.

The terminal performs demodulation and descrambling on the system information transmitted on the system information repetition transmission resource area by using one system information scheduling period as a unit. The following modes are included:

The coding bit length of the repetitively-transmitted system information is determined according to the total number of available resource elements in all system information repetition transmission resource areas within one system information scheduling period. The scrambling length is equal to the coding bit length of the repetitively-transmitted system information after rate matching. As shown in FIG. 5, the total number of available resource elements in all system information repetition transmission resource areas within one system information scheduling period is 960, QPSK modulation is adopted for the repetitive transmission of the system information and the coding bit length of the repetitively-transmitted system information after rate matching is 1920 bits. As shown in FIG. 6, the total number of available resource elements in all system information repetition transmission resource areas within one system information scheduling period is 1902, QPSK modulation is adopted for the repetitive transmission of the system information and the coding bit length of the repetitively-transmitted system information after rate matching is 3840 bits. As shown in FIG. 7, the total number of available resource elements in all system information repetition transmission resource areas within one system information scheduling period is 5568, QPSK modulation is adopted for the repetitive transmission of the system information and the coding bit length of the repetitively-transmitted system information after rate matching is 11136 bits.

Or, the terminal performs demodulation and descrambling on the system information transmitted on the system information repetition transmission resource area by using one radio frame period as a unit. The coding bit length of the repetitively-transmitted system information after rate matching is determined according to the total number of available resource elements in all system information repetition transmission resource area blocks within one radio frame. The scrambling length is equal to the coding bit length of the repetitively-transmitted system information after rate matching. As shown in FIG. 5, the total number of available resource elements within the radio frame is 240, QPSK modulation is adopted for the repetitive transmission of the system information and the coding bit length of the repetitively-transmitted system information after rate matching is 480 bits. As shown in FIG. 6, the total number of available resource elements within the radio frame with SFN %4=0 or 2 is 240, QPSK modulation is adopted for the repetitive transmission of the system information and the coding bit length of the repetitively-transmitted system information after rate matching is 480 bits; and the total number of available resource elements within the radio frame with SFN %4=1 or 3 is 720, QPSK modulation is adopted for the repetitive transmission of the system information and the coding bit length of the repetitively-transmitted system information after rate matching is 1440 bits. As shown in FIG. 7, the total number of available resource elements in all system information repetition transmission resource areas within the radio frame is 1392, QPSK modulation is adopted for the repetitive transmission of the system information and the coding bit length of the repetitively-transmitted system information after rate matching is 2784 bits. The scrambling length is equal to the coding bit length of the repetitively-transmitted system information after rate matching.

Or, the terminal performs demodulation and descrambling on the repetitively-transmitted system information received on symbols in the system information repetition transmission resource area. At this moment, the repetitively-transmitted system information received on the system information repetition transmission resource area comes from a system information coding block transmitted on a broadcast channel, wherein the repetitively-transmitted system information received on resource elements corresponding to symbols containing CRSs in the system information repetition transmission resource area blocks is the same as system information coding block information received on at least one broadcast channel resource symbol containing the CRSs, and the repetitively-transmitted system information received on resource elements corresponding to symbols not containing the CRSs in the system information repetition transmission resource area blocks is the same as system information coding block information received on at least one broadcast channel resource symbol not containing the CRSs.

At Step 402, the terminal performs joint decoding on the system information received on the broadcast channel and the system information received on the system information repetition transmission resource area.

This embodiment of the present document can guarantee the consistency of the enhanced transmission solution of the system information under different FDD and TDD systems and different TDD uplink and downlink configurations, and can guarantee that the terminal successfully accesses to a network by continuously trying to perform joint decoding on the system information transmitted on the broadcast channel and the system information repetition transmission resource.

Embodiment 2

This embodiment of the present document provides a method for transmitting system information. This embodiment of the present document describes system information transmission in detail by adopting a method for transmitting system information in an enhanced manner provided by this embodiment of the present document under an FDD system, wherein the situation that a downlink control channel occupies three OFDM symbols is taken as an example.

Figure 8:
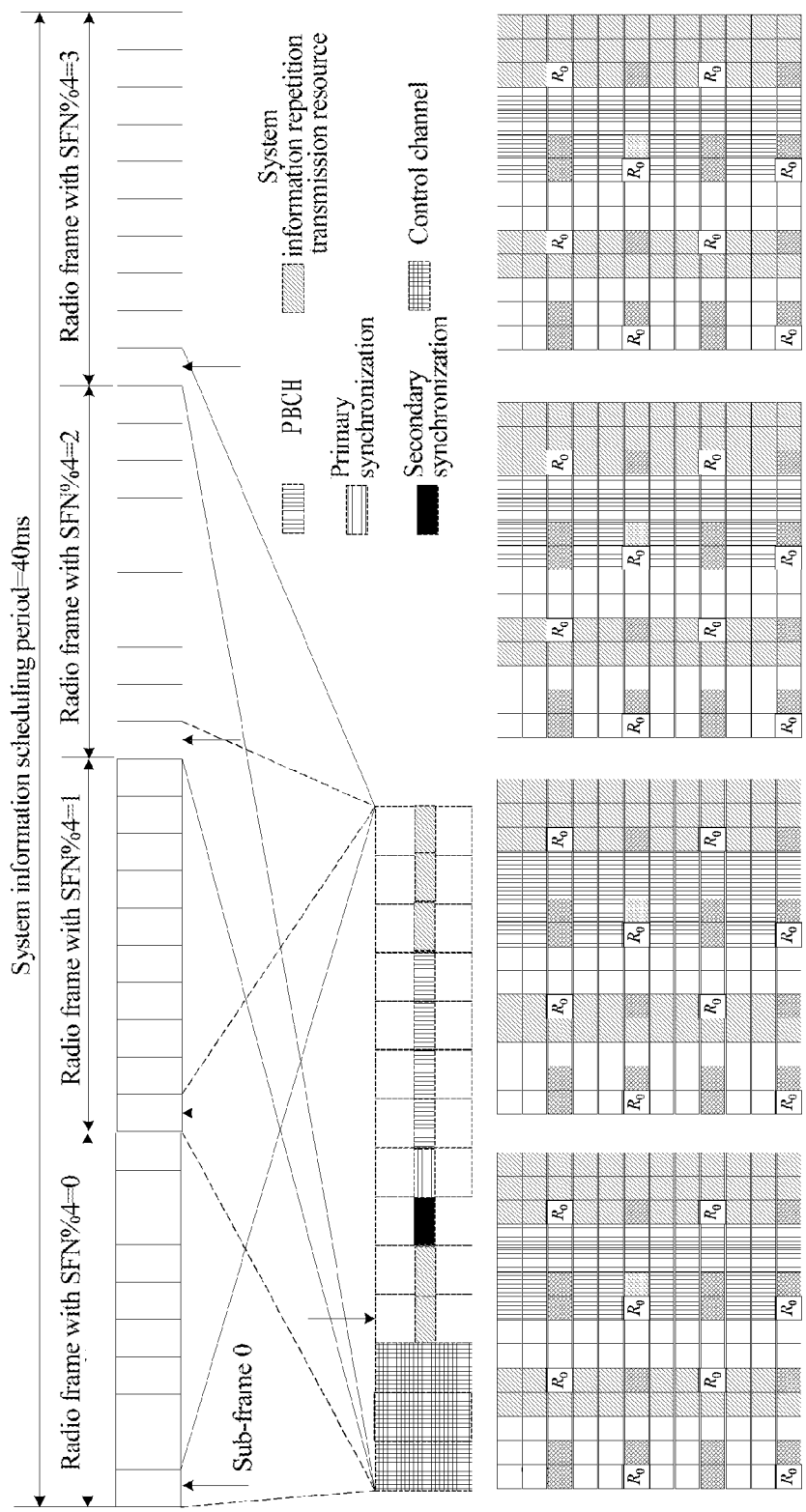
FIG. 8 is a schematic diagram of a system information repetition transmission resource area under an FDD system.
Figure 9:
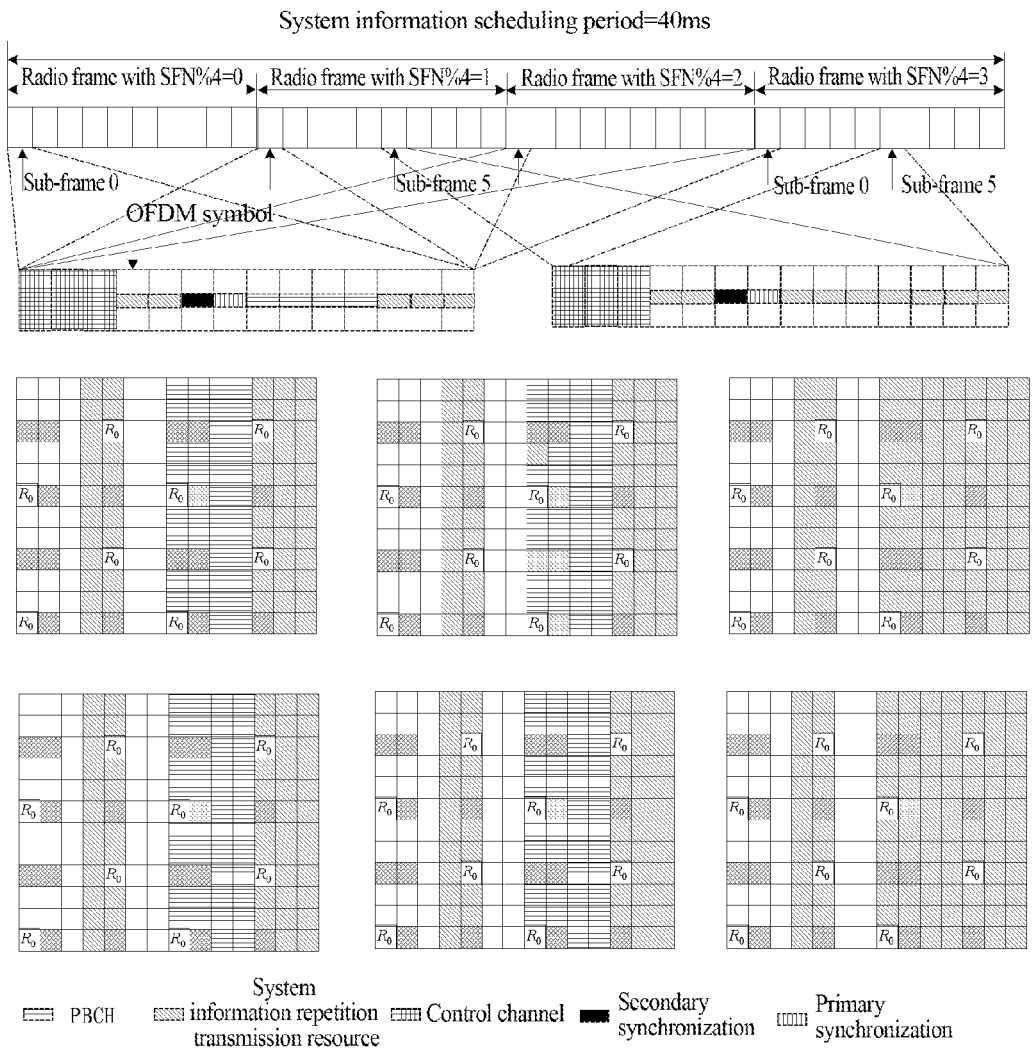
FIG. 9 is a schematic diagram of another system information repetition transmission resource area under an FDD system.
Figure 10:
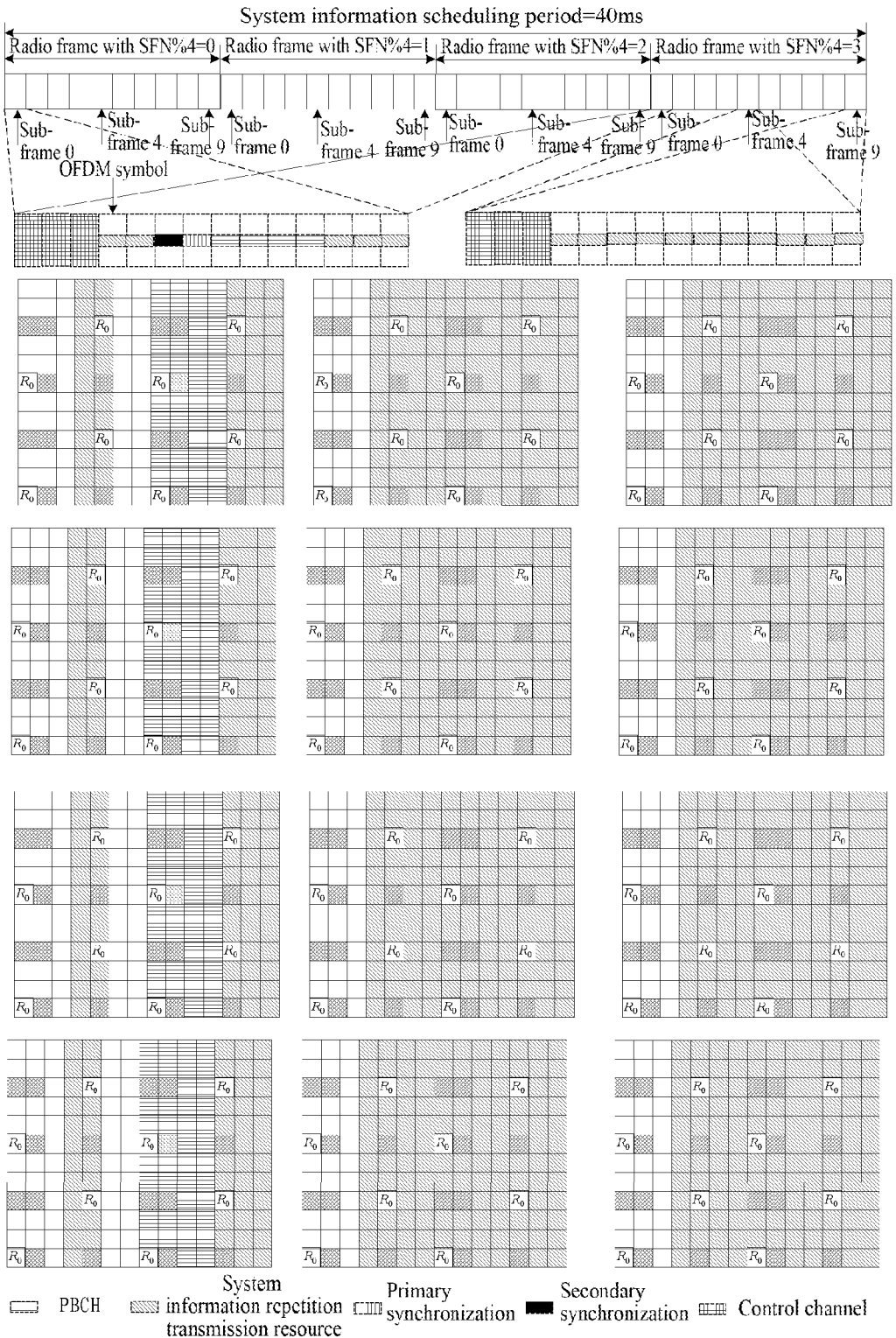
FIG. 10 is a schematic diagram of another system information repetition transmission resource area under an FDD system.

Base-station-side processing steps, as shown in FIG. 3, comprise:

At Step 301, it is to determine a system information repetition transmission resource area within a system information scheduling period. The system information repetition transmission resource area comprises resource elements for repetitively transmitting the system information. The system information repetition transmission resource area consists of one or more system information repetition transmission resource area blocks, one system information repetition transmission resource area block consists of M continuous OFDM symbols in time domain and comprising 72 subcarriers in frequency domain, $M \geq 1$ and $M \leq 7$. Within a system information scheduling period, the system information repetition transmission resource area is on a sub-frame 0 of a radio frame. As shown in FIG. 8, the system information repetition transmission resource area comprises the system information repetition transmission resource area block on the 4th and 5th symbols of the first time slot and the system information repetition transmission resource area block on the last 1st, 2nd and 3rd symbols of the second time slot on the sub-frame 0 of the radio frame. Or, within a system information scheduling period, the system information repetition transmission resource area is on a sub-frame 0 of a radio frame and a sub-frame 5 of a radio frame with SFN %4=1 or 3. As shown in FIG. 9, the system information repetition transmission resource area comprises the system information repetition transmission resource area block on the 4th and 5th symbols of the first time slot and the system information repetition transmission resource area block on the last 1st, 2nd and 3rd symbols of the second time slot on the sub-frame 0 of the radio frame, and the system information repetition transmission resource area block on the 4th and 5th symbols of the first time slot and the system information repetition transmission resource area block on the 1st, 2nd, 3rd, 4th, 5th, 6th and 7th symbols of the second time slot on a sub-frame 5 of the radio frame with SFN$4=1 or 3. Or, within a system information scheduling period, the system information repetition transmission resource area is on a sub-frame 0 of a radio frame and N other sub-frames of the radio frame, $N \geq 1$ and $N < 10$. As shown in FIG. 10, the system information repetition transmission resource area comprises the system information repetition transmission resource area block on the 4th and 5th symbols of the first time slot and the system information repetition transmission resource area block on the last 1st, 2nd and 3rd symbols of the second time slot on the sub-frame 0 of the radio frame, and the system information repetition transmission resource area blocks on symbols except first three symbols of the first time slot on a sub-frame 4 and a sub-frame 9 of the radio frame.

At Step 302, a base station determines according to a predefined transmission mode or dynamically determines whether to transmit the repetitively-transmitted system information within a system information scheduling period. The predefined transmission mode refers to a mode for predefining that the repetitively-transmitted system information is transmitted in which system information scheduling periods in a frame number transmission period (the length of 1024 radio frames).

At Step 303, it is to perform coding, rate matching, scrambling and modulation on the system information, and map the system information to available resource elements of the system information repetition transmission resource area within the system information scheduling period to transmit. Available resource elements of the system information repetition transmission resource area refer to resource elements except resource elements for transmitting Cell-specific Reference Signals (CRSs) in the system information repetition transmission resource area. The system information refers to Master Information Block (MIB) or Advanced Master Information Block (Advanced-MIB) plus Cyclic Redundancy Check (CRC), wherein the length of the MIB is 24 bits and the length of the CRC is 16 bits. The following three modes are mainly included:

303-$a$: it is to perform the coding, rate matching, scrambling, modulation and mapping within one system information scheduling period; and determine the coding bit length of the repetitively-transmitted system information after rate matching according to the total number of available resource elements in all system information repetition transmission resource areas within the one system information scheduling period. As shown in FIG. 8, the total number of available resource elements in all system information repetition transmission resource areas within one system information scheduling period is 1248, QPSK modulation is adopted for the repetitive transmission of the system information and the coding bit length of the repetitively-transmitted system information after rate matching is 2496 bits. As shown in FIG. 9, the total number of available resource elements in all system information repetition transmission resource areas within one system information scheduling period is 2352, QPSK modulation is adopted for the repetitive transmission of the system information and the coding bit length of the repetitively-transmitted system information after rate matching is 4704 bits. As shown in FIG. 10, the total number of available resource elements in all system information repetition transmission resource areas within one system information scheduling period is 5856, QPSK modulation is adopted for the repetitive transmission of the system information and the coding bit length of the repetitively-transmitted system information after rate matching is 11712 bits. The scrambling length is equal to the coding bit length of the repetitively-transmitted system information after rate matching. After scrambling and modulation, coding bits of the repetitively-transmitted system information after rate matching are mapped to available resource elements in all system information repetition transmission resource areas within the system information scheduling period. The repetitively-transmitted system information after modulation is firstly mapped to all available resource elements corresponding to the first symbol in the first repetition transmission resource area block within the system information scheduling period according to a sequence of first frequency domain and then time domain, then is sequentially mapped to all available resource elements corresponding to a next symbol in the first repetition transmission resource area block, and then is mapped to a next repetition transmission resource area block, and so on.

303-$b$: it is to perform the coding, rate matching, scrambling, modulation and mapping within one radio frame; and determine the coding bit length of the repetitively-transmitted system information after rate matching according to the total number of available resource elements in all system information repetition transmission resource area blocks within the one radio frame. As shown in FIG. 8, the total number of available resource elements within the radio frame is 312, QPSK modulation is adopted for the repetitive transmission of the system information and the coding bit length of the repetitively-transmitted system information after rate matching is 624 bits. As shown in FIG. 9, the total number of available resource elements within the radio frame with SFN %4=0 or 2 is 312, QPSK modulation is adopted for the repetitive transmission of the system information and the coding bit length of the repetitively-transmitted system information after rate matching is 624 bits; and the total number of available resource elements within the radio frame with SFN %4=1 or 3 is 864, QPSK modulation is adopted for the repetitive transmission of the system information and the coding bit length of the repetitively-transmitted system information after rate matching is 1728 bits. As shown in FIG. 10, the total number of available resource elements in all system information repetition transmission resource areas within the radio frame is 1464, QPSK modulation is adopted for the repetitive transmission of the system information and the coding bit length of the repetitively-transmitted system information after rate matching is 2928 bits. The scrambling length is equal to the coding bit length of the repetitively-transmitted system information after rate matching. After scrambling and modulation, coding bits of the repetitively-transmitted system information after rate matching are mapped to available resource elements in all system information repetition transmission resource areas within the corresponding radio frame. The repetitively-transmitted system information after modulation is firstly mapped to all available resource elements corresponding to the first symbol in the first repetition transmission resource area block within the corresponding radio frame according to a sequence of first frequency domain and then time domain, then is sequentially mapped to all available resource elements corresponding to a next symbol in the first repetition transmission resource area block, and then is mapped to a next repetition transmission resource area block, and so on.

303-$c$: it is to perform the coding, rate matching, scrambling and mapping, and map a system information coding block transmitted on a broadcast channel to the system information repetition transmission resource area. A mapping mode is determined according to whether a symbol in a system information repetition transmission resource contains CRSs. Therein, system information coding blocks transmitted on broadcast channel resource symbols containing the CRSs are selected and mapped to resource elements corresponding to symbols containing the CRSs in the system information repetition transmission resource area blocks. System information coding blocks transmitted on broadcast channel resource symbols not containing the CRSs are selected and mapped to resource elements corresponding to symbols not containing the CRSs in the system information repetition transmission resource area blocks.

Terminal-side processing steps, as shown in FIG. 4, comprise:

At Step 401, a terminal detects system information within a system information scheduling period, wherein the system information is system information transmitted on a broadcast channel and system information transmitted on a system information repetition transmission resource area. The system information repetition transmission resource area consists of one or more system information repetition transmission resource area blocks, one system information repetition transmission resource area block consists of M continuous OFDM symbols in time domain and comprises 72 subcarriers in frequency domain, $M \geq 1$ and $M \leq 7$. Within a system information scheduling period, the system information repetition transmission resource area is on a sub-frame 0 of a radio frame. As shown in FIG. 8, the system information repetition transmission resource area comprises the system information repetition transmission resource area block on the 4th and 5th symbols of the first time slot and the system information repetition transmission resource area block on the last 1st, 2nd and 3rd symbols of the second time slot on the sub-frame 0 of the radio frame. Or, within a system information scheduling period, the system information repetition transmission resource area is on a sub-frame 0 of a radio frame and a sub-frame 5 of a radio frame with SFN %4=1 or 3. As shown in FIG. 9, the system information repetition transmission resource area comprises the system information repetition transmission resource area block on the 4th and 5th symbols of the first time slot and the system information repetition transmission resource area block on the last 1st, 2nd and 3rd symbols of the second time slot on the sub-frame 0 of the radio frame, and the system information repetition transmission resource area block on the 4th and 5th symbols of the first time slot and the system information repetition transmission resource area block on the 1st, 2nd, 3rd, 4th, 5th, 6th and 7th symbols of the second time slot on a sub-frame 5 of the radio frame with SFN$4=1 or 3. Or, within a system information scheduling period, the system information repetition transmission resource area is on a sub-frame 0 of a radio frame and N other sub-frames of the radio frame, N≥1 and N<10. As shown in FIG. 10, the system information repetition transmission resource area comprises the system information repetition transmission resource area block on the 4th and 5th symbols of the first time slot and the system information repetition transmission resource area block on the last 1st, 2nd and 3rd symbols of the second time slot on the sub-frame 0 of the radio frame, and the system information repetition transmission resource area blocks on symbols except first three symbols of the first time slot on a sub-frame 4 and a sub-frame 9 of the radio frame.

The terminal performs demodulation and descrambling on the system information transmitted on the system information repetition transmission resource area by using one system information scheduling period as a unit. The following modes are included:

The coding bit length of the repetitively-transmitted system information is determined according to the total number of available resource elements in all system information repetition transmission resource areas within one system information scheduling period. The scrambling length is equal to the coding bit length of the repetitively-transmitted system information after rate matching. As shown in FIG. 8, the total number of available resource elements in all system information repetition transmission resource areas within one system information scheduling period is 1248, QPSK modulation is adopted for the repetitive transmission of the system information and the coding bit length of the repetitively-transmitted system information after rate matching is 2496 bits. As shown in FIG. 9, the total number of available resource elements in all system information repetition transmission resource areas within one system information scheduling period is 2352, QPSK modulation is adopted for the repetitive transmission of the system information and the coding bit length of the repetitively-transmitted system information after rate matching is 4704 bits. As shown in FIG. 10, the total number of available resource elements in all system information repetition transmission resource areas within one system information scheduling period is 5856, QPSK modulation is adopted for the repetitive transmission of the system information and the coding bit length of the repetitively-transmitted system information after rate matching is 11712 bits.

Or, the terminal performs demodulation and descrambling on the system information transmitted on the system information repetition transmission resource area by using one radio frame period as a unit. The coding bit length of the repetitively-transmitted system information after rate matching is determined according to the total number of available resource elements in all system information repetition transmission resource area blocks within one radio frame. The scrambling length is equal to the coding bit length of the repetitively-transmitted system information after rate matching. As shown in FIG. 8, the total number of available resource elements within the radio frame is 312, QPSK modulation is adopted for the repetitive transmission of the system information and the coding bit length of the repetitively-transmitted system information after rate matching is 624 bits. As shown in FIG. 9, the total number of available resource elements within the radio frame with SFN %4=0 or 2 is 312, QPSK modulation is adopted for the repetitive transmission of the system information and the coding bit length of the repetitively-transmitted system information after rate matching is 624 bits; and the total number of available resource elements within the radio frame with SFN %4=1 or 3 is 864, QPSK modulation is adopted for the repetitive transmission of the system information and the coding bit length of the repetitively-transmitted system information after rate matching is 1728 bits. As shown in FIG. 10, the total number of available resource elements in all system information repetition transmission resource areas within the radio frame is 1464, QPSK modulation is adopted for the repetitive transmission of the system information and the coding bit length of the repetitively-transmitted system information after rate matching is 2928 bits. The scrambling length is equal to the coding bit length of the repetitively-transmitted system information after rate matching.

Or, the terminal performs demodulation and descrambling on the repetitively-transmitted system information received on symbols in the system information repetition transmission resource area. At this moment, the repetitively-transmitted system information received on the system information repetition transmission resource area comes from a system information coding block transmitted on a broadcast channel, wherein the repetitively-transmitted system information received on resource elements corresponding to symbols containing CRSs in the system information repetition transmission resource area blocks is the same as system information coding block information received on at least one broadcast channel resource symbol containing the CRSs, and the repetitively-transmitted system information received on resource elements corresponding to symbols not containing the CRSs in the system information repetition transmission resource area blocks is the same as system information coding block information received on at least one broadcast channel resource symbol not containing the CRSs.

At Step 402, the terminal performs joint decoding on the system information received on the broadcast channel and the system information received on the system information repetition transmission resource area.

This embodiment of the present document can guarantee that the terminal successfully accesses to a network under an FDD system by continuously trying to perform joint decoding on the system information transmitted on the broadcast channel and the system information repetition transmission resource.

Embodiment 3

This embodiment of the present document provides a method for transmitting system information. This embodiment of the present document describes system information transmission in detail by adopting a method for transmitting system information in an enhanced manner provided by this embodiment of the present document under a TDD (Frequency Division Duplexing) system, wherein the situation that a downlink control channel occupies three OFDM symbols is taken as an example.

Figure 11:
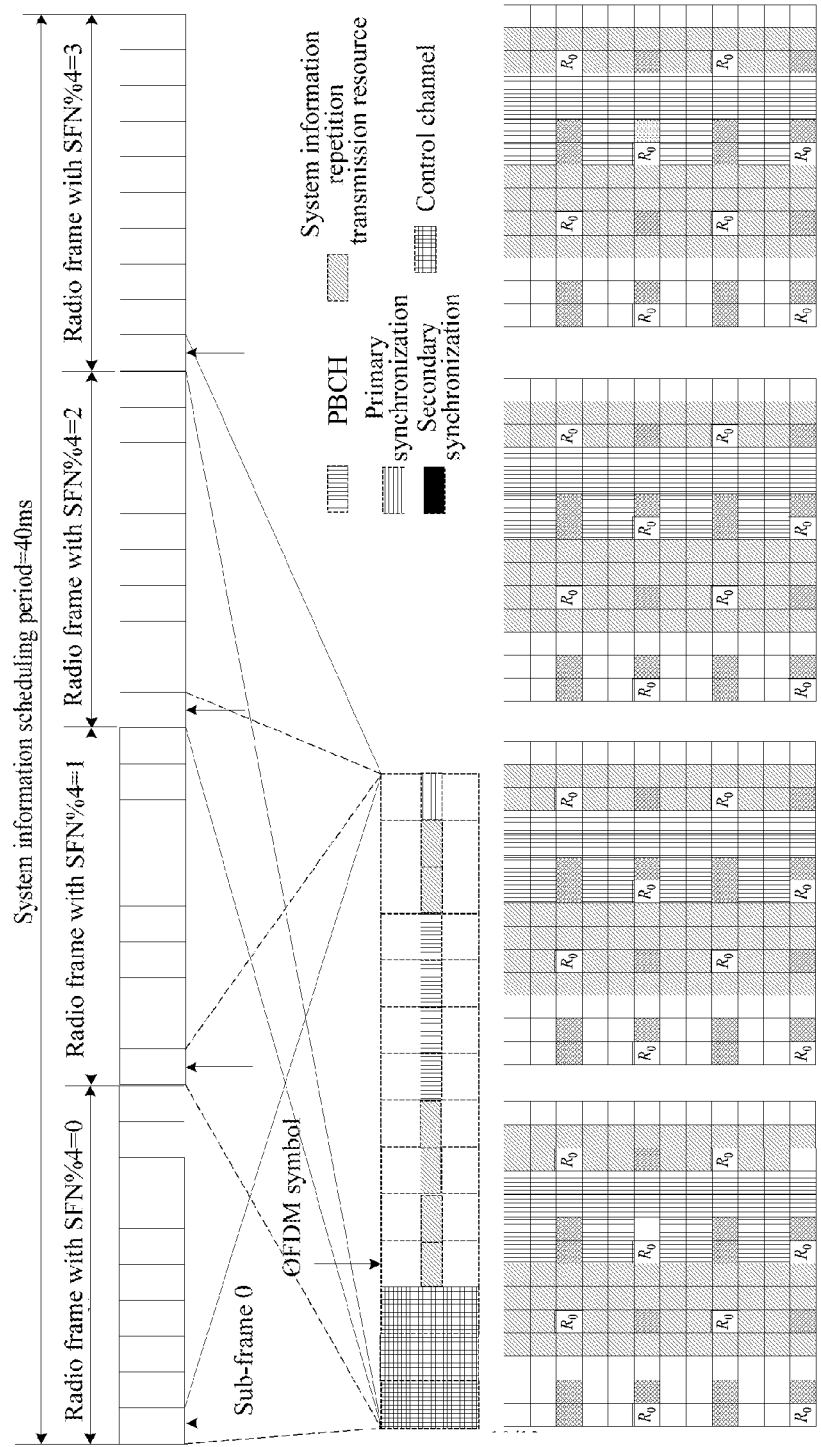
FIG. 11 is a schematic diagram of a system information repetition transmission resource area under a TDD system.
Figure 12:
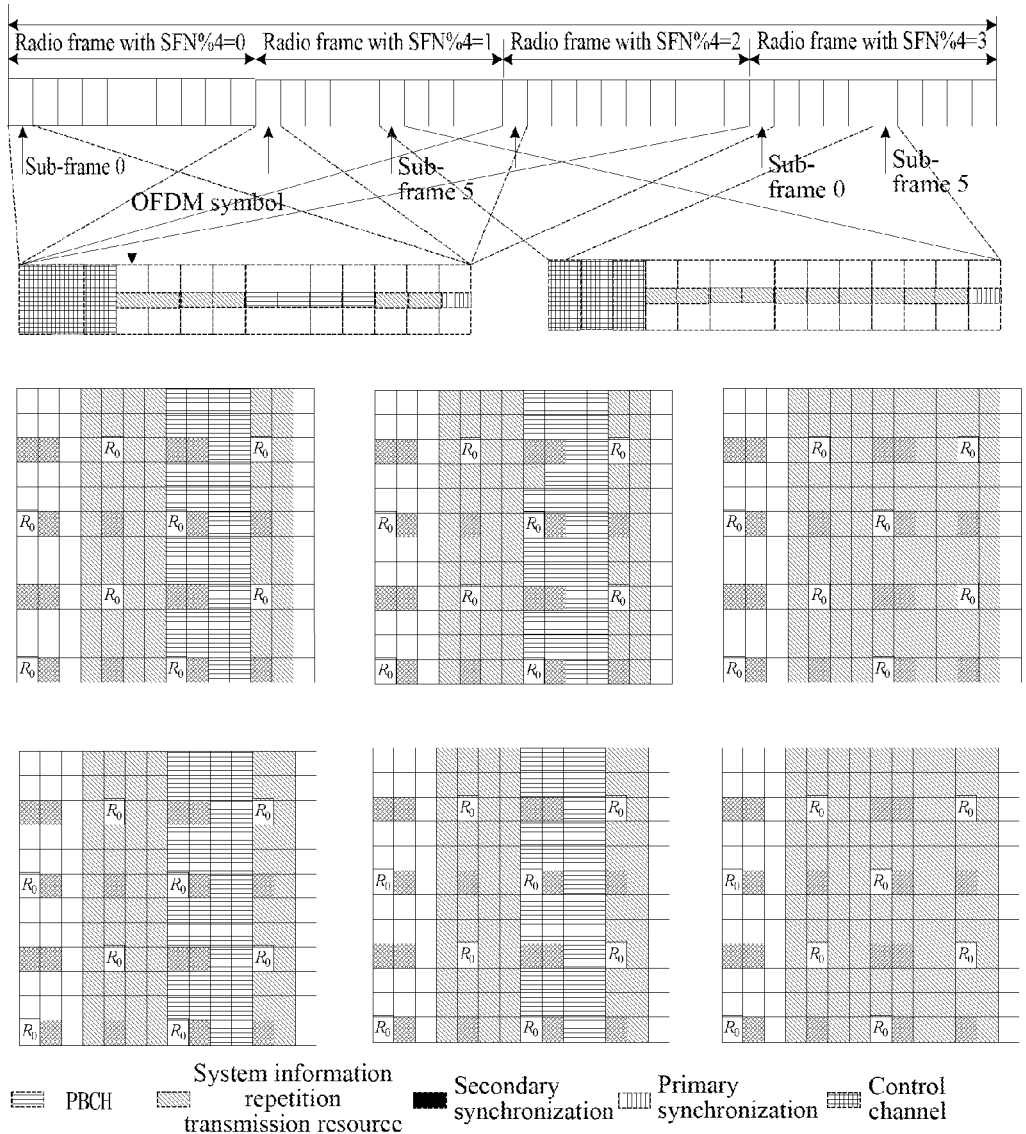
FIG. 12 is a schematic diagram of another system information repetition transmission resource area under a TDD system.
Figure 13:
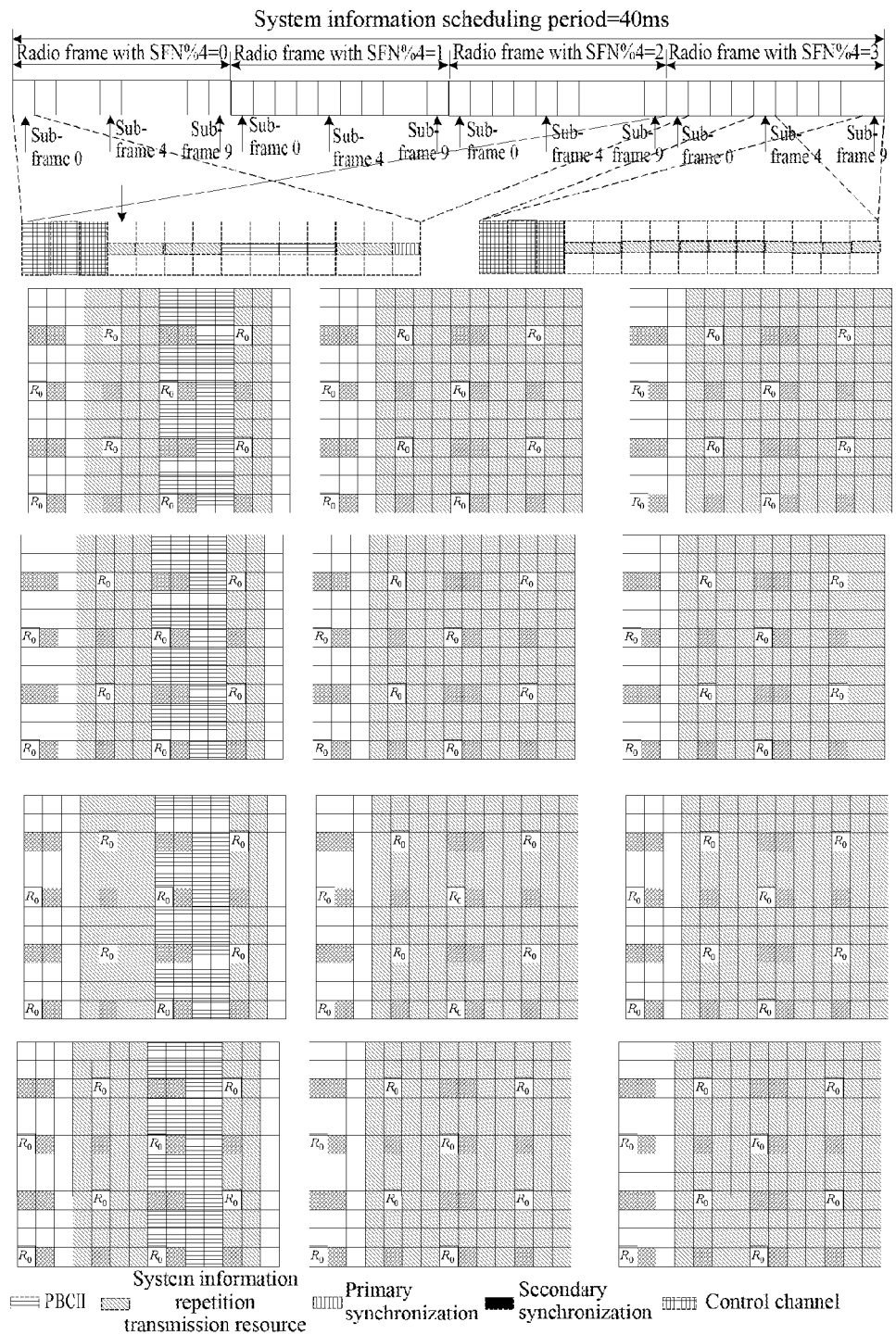
FIG. 13 is a schematic diagram of another system information repetition transmission resource area under a TDD system.

Base-station-side processing steps, as shown in FIG. 3, comprise:

At Step 301, it is to determine a system information repetition transmission resource area within a system information scheduling period. The system information repetition transmission resource area comprises resource elements for repetitively transmitting the system information. The system information repetition transmission resource area consists of one or more system information repetition transmission resource area blocks, one system information repetition transmission resource area block consists of M continuous OFDM symbols in time domain and comprising 72 subcarriers in frequency domain, M≥1 and M≤7. Within a system information scheduling period, the system information repetition transmission resource area is on a sub-frame 0 of a radio frame. As shown in FIG. 11, the system information repetition transmission resource area comprises the system information repetition transmission resource area block on the 4th, 5th, 6th and 7th symbols of the first time slot and the system information repetition transmission resource area block on the last 2nd and 3rd symbols of the second time slot on the sub-frame 0 of the radio frame. Or, within a system information scheduling period, the system information repetition transmission resource area is on a sub-frame 0 of a radio frame and a sub-frame 5 of a radio frame with SFN %4=1 or 3. As shown in FIG. 12, the system information repetition transmission resource area comprises the system information repetition transmission resource area block on the 4th, 5th, 6th and 7th symbols of the first time slot and the system information repetition transmission resource area block on the last 2nd and 3rd symbols of the second time slot on the sub-frame 0 of the radio frame, and the system information repetition transmission resource area block on the 4th, 5th, 6th and 7th symbols of the first time slot and the system information repetition transmission resource area block on the 1st, 2nd, 3rd, 4th, 5th and 6th symbols of the second time slot on a sub-frame 5 of the radio frame with SFN$4=1 or 3. Or, within a system information scheduling period, the system information repetition transmission resource area is on a sub-frame 0 of a radio frame and N other sub-frames of the radio frame, N≥1 and N<10. As shown in FIG. 13, the system information repetition transmission resource area comprises the system information repetition transmission resource area block on the 4th, 5th, 6th and 7th symbols of the first time slot and a system information repetition transmission resource area block on the last 2nd and 3rd symbols of the second time slot on the sub-frame 0 of the radio frame, and the system information repetition transmission resource area blocks on symbols except first three symbols of the first time slot on a sub-frame 4 and a sub-frame 9 of the radio frame.

At Step 302, a base station determines according to a predefined transmission mode or dynamically determines whether to transmit the repetitively-transmitted system information within a system information scheduling period. The predefined transmission mode refers to a mode for predefining that the repetitively-transmitted system information is transmitted in which system information scheduling periods in a frame number transmission period (the length of 1024 radio frames).

At Step 303, it is to perform coding, rate matching, scrambling and modulation on the system information, and map the system information to available resource elements of the system information repetition transmission resource area within the system information scheduling period to transmit. Available resource elements of the system information repetition transmission resource area refer to resource elements except resource elements for transmitting Cell-specific Reference Signals (CRSs) in the system information repetition transmission resource area. The system information refers to Master Information Block (MIB) or Advanced Master Information Block (Advanced-MIB) plus Cyclic Redundancy Check (CRC), wherein the length of the MIB is 24 bits and the length of the CRC is 16 bits. The following three modes are mainly included:

303-*a*: it is to perform the coding, rate matching, scrambling, modulation and mapping within one system information scheduling period; and determine the coding bit length of the repetitively-transmitted system information after rate matching according to the total number of available resource elements in all system information repetition transmission resource areas within the one system information scheduling period. As shown in FIG. 11, the total number of available resource elements in all system information repetition transmission resource areas within one system information scheduling period is 1536, QPSK modulation is adopted for the repetitive transmission of the system information and the coding bit length of the repetitively-transmitted system information after rate matching is 3072 bits. As shown in FIG. 12, the total number of available resource elements in all system information repetition transmission resource areas within one system information scheduling period is 2784, QPSK modulation is adopted for the repetitive transmission of the system information and the coding bit length of the repetitively-transmitted system information after rate matching is 5568 bits. As shown in FIG. 13, the total number of available resource elements in all system information repetition transmission resource areas within one system information scheduling period is 7104, QPSK modulation is adopted for the repetitive transmission of the system information and the coding bit length of the repetitively-transmitted system information after rate matching is 14208 bits. The scrambling length is equal to the coding bit length of the repetitively-transmitted system information after rate matching. After scrambling and modulation, coding bits of the repetitively-transmitted system information after rate matching are mapped to available resource elements in all system information repetition transmission resource areas within the system information scheduling period. The repetitively-transmitted system information after modulation is firstly mapped to all available resource elements corresponding to the first symbol in the first repetition transmission resource area block within the system information scheduling period according to a sequence of first frequency domain and then time domain, then is sequentially mapped to all available resource elements corresponding to a next symbol in the first repetition transmission resource area block, and then is mapped to a next repetition transmission resource area block, and so on.

303-*b*: it is to perform the coding, rate matching, scrambling, modulation and mapping within one radio frame; and determine the coding bit length of the repetitively-transmitted system information after rate matching according to the total number of available resource elements in all system information repetition transmission resource area blocks within the one radio frame. As shown in FIG. 11, the total number of available resource elements within the radio frame is 384, QPSK modulation is adopted for the repetitive transmission of the system information and the coding bit length of the repetitively-transmitted system information after rate matching is 768 bits. As shown in FIG. 12, the total number of available resource elements within the radio frame with SFN %4=0 or 2 is 384, QPSK modulation is adopted for the repetitive transmission of the system information and the coding bit length of the repetitively-transmitted system information after rate matching is 768 bits; and the total number of available resource elements within the radio frame with SFN %4=1 or 3 is 1008, QPSK modulation is adopted for the repetitive transmission of the system information and the coding bit length of the repetitively-transmitted system information after rate matching is 2016 bits. As shown in FIG. 13, the total number of available resource elements in all system information repetition transmission resource areas within the radio frame is 1776, QPSK modulation is adopted for the repetitive transmission of the system information and the coding bit length of the repetitively-transmitted system information after rate matching is 3552 bits. The scrambling length is equal to the coding bit length of the repetitively-transmitted system information after rate matching. After scrambling and modulation, coding bits of the repetitively-transmitted system information after rate matching are mapped to available resource elements in all system information repetition transmission resource areas within the corresponding radio frame. The repetitively-transmitted system information after modulation is firstly mapped to all available resource elements corresponding to the first symbol in the first repetition transmission resource area block within the corresponding radio frame according to a sequence of first frequency domain and then time domain, then is sequentially mapped to all available resource elements corresponding to a next symbol in the first repetition transmission resource area block, and then is mapped to a next repetition transmission resource area block, and so on.

303-c: it is to perform the coding, rate matching, scrambling and mapping, and map a system information coding block transmitted on a broadcast channel to the system information repetition transmission resource area. A mapping mode is determined according to whether a symbol in a system information repetition transmission resource contains CRSs. Therein, system information coding blocks transmitted on broadcast channel resource symbols containing the CRSs are selected and mapped to resource elements corresponding to symbols containing the CRSs in the system information repetition transmission resource area blocks. System information coding blocks transmitted on broadcast channel resource symbols not containing the CRSs are selected and mapped to resource elements corresponding to symbols not containing the CRSs in the system information repetition transmission resource area blocks.

Terminal-side processing steps, as shown in FIG. 4, comprise:

At Step 401, a terminal detects system information within a system information scheduling period, wherein the system information is system information transmitted on a broadcast channel and system information transmitted on a system information repetition transmission resource area. The system information repetition transmission resource area consists of one or more system information repetition transmission resource area blocks, one system information repetition transmission resource area block consists of M continuous OFDM symbols in time domain and comprises 72 subcarriers in frequency domain, M≥1 and M≤7. Within a system information scheduling period, the system information repetition transmission resource area is on a sub-frame 0 of a radio frame. As shown in FIG. 11, the system information repetition transmission resource area comprises the system information repetition transmission resource area block on the 4th, 5th, 6th and 7th symbols of the first time slot and the system information repetition transmission resource area block on the last 2nd and 3rd symbols of the second time slot on the sub-frame 0 of the radio frame. Or, within a system information scheduling period, the system information repetition transmission resource area is on a sub-frame 0 of a radio frame and a sub-frame 5 of a radio frame with SFN %4=1 or 3. As shown in FIG. 12, the system information repetition transmission resource area comprises the system information repetition transmission resource area block on the 4th, 5th, 6th and 7th symbols of the first time slot and the system information repetition transmission resource area block on the last 2nd and 3rd symbols of the second time slot on the sub-frame 0 of the radio frame, and the system information repetition transmission resource area block on the 4th, 5th, 6th and 7th symbols of the first time slot and the system information repetition transmission resource area block on the 1st, 2nd, 3rd, 4th, 5th and 6th symbols of the second time slot on a sub-frame 5 of the radio frame with SFN$4=1 or 3. Or, within a system information scheduling period, the system information repetition transmission resource area is on a sub-frame 0 of a radio frame and N other sub-frames of the radio frame, N≥1 and N<10. As shown in FIG. 13, the system information repetition transmission resource area comprises the system information repetition transmission resource area block on the 4th, 5th, 6th and 7th symbols of the first time slot and the system information repetition transmission resource area block on the last 2nd and 3rd symbols of the second time slot on the sub-frame 0 of the radio frame, and the system information repetition transmission resource area blocks on symbols except first three symbols of the first time slot on a sub-frame 4 and a sub-frame 9 of the radio frame.

The terminal performs demodulation and descrambling on the system information transmitted on the system information repetition transmission resource area by using one system information scheduling period as a unit. The following modes are included:

The coding bit length of the repetitively-transmitted system information is determined according to the total number of available resource elements in all system information repetition transmission resource areas within one system information scheduling period. The scrambling length is equal to the coding bit length of the repetitively-transmitted system information after rate matching. As shown in FIG. 11, the total number of available resource elements in all system information repetition transmission resource areas within one system information scheduling period is 1536, QPSK modulation is adopted for the repetitive transmission of the system information and the coding bit length of the repetitively-transmitted system information after rate matching is 3072 bits. As shown in FIG. 12, the total number of available resource elements in all system information repetition transmission resource areas within one system information scheduling period is 2784, QPSK modulation is adopted for the repetitive transmission of the system information and the coding bit length of the repetitively-transmitted system information after rate matching is 5568 bits.

As shown in FIG. 13, the total number of available resource elements in all system information repetition transmission resource areas within one system information scheduling period is 7104, QPSK modulation is adopted for the repetitive transmission of the system information and the coding bit length of the repetitively-transmitted system information after rate matching is 14208 bits.

Or, the terminal performs demodulation and descrambling on the system information transmitted on the system information repetition transmission resource area by using one radio frame period as a unit. The coding bit length of the repetitively-transmitted system information after rate matching is determined according to the total number of available resource elements in all system information repetition transmission resource area blocks within one radio frame. The scrambling length is equal to the coding bit length of the repetitively-transmitted system information after rate matching. As shown in FIG. 11, the total number of available resource elements within the radio frame is 384, QPSK modulation is adopted for the repetitive transmission of the system information and the coding bit length of the repetitively-transmitted system information after rate matching is 768 bits. As shown in FIG. 12, the total number of available resource elements within the radio frame with SFN %4=0 or 2 is 384, QPSK modulation is adopted for the repetitive transmission of the system information and the coding bit length of the repetitively-transmitted system information after rate matching is 768 bits; and the total number of available resource elements within the radio frame with SFN %4=1 or 3 is 1008, QPSK modulation is adopted for the repetitive transmission of the system information and the coding bit length of the repetitively-transmitted system information after rate matching is 2016 bits. As shown in FIG. 13, the total number of available resource elements in all system information repetition transmission resource areas within the radio frame is 1776, QPSK modulation is adopted for the repetitive transmission of the system information and the coding bit length of the repetitively-transmitted system information after rate matching is 3552 bits. The scrambling length is equal to the coding bit length of the repetitively-transmitted system information after rate matching.

Or, the terminal performs demodulation and descrambling on the repetitively-transmitted system information received on symbols in the system information repetition transmission resource area. At this moment, the repetitively-transmitted system information received on the system information repetition transmission resource area comes from a system information coding block transmitted on a broadcast channel, wherein the repetitively-transmitted system information received on resource elements corresponding to symbols containing CRSs in the system information repetition transmission resource area blocks is the same as system information coding block information received on at least one broadcast channel resource symbol containing the CRSs, and the repetitively-transmitted system information received on resource elements corresponding to symbols not containing the CRSs in the system information repetition transmission resource area blocks is the same as system information coding block information received on at least one broadcast channel resource symbol not containing the CRSs.

At Step 402, the terminal performs joint decoding on the system information received on the broadcast channel and the system information received on the system information repetition transmission resource area.

Embodiment 4

Figure 14:
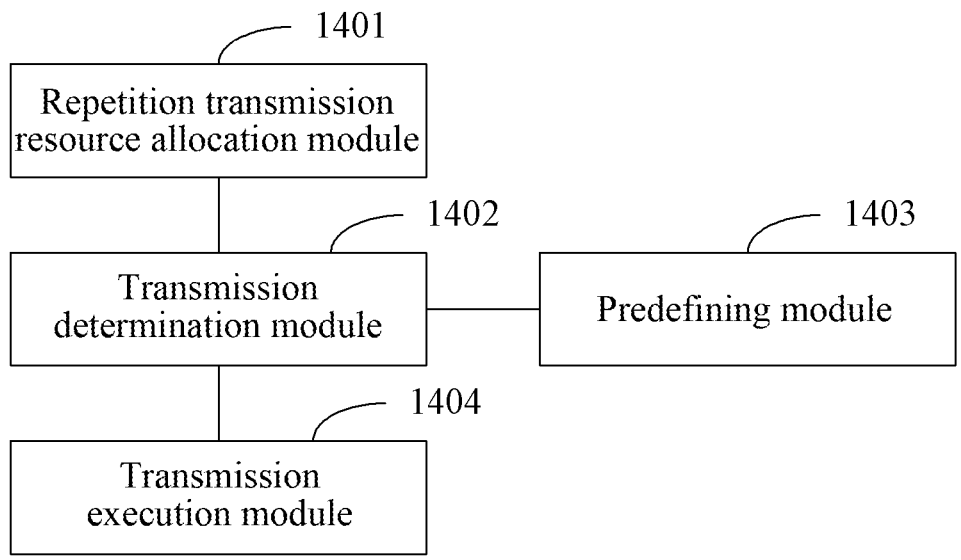
FIG. 14 is a structural schematic diagram of an apparatus for transmitting system information provided by embodiment 4 of the present document.

The embodiment of the present document provides an apparatus for transmitting system information. A structure thereof is as shown in FIG. 14. The apparatus for transmitting system information comprises:

a repetition transmission resource allocation module 1401 configured to determine a system information repetition transmission resource area within a system information scheduling period, wherein the system information repetition transmission resource area comprises resource elements for repetitively transmitting the system information.

Preferably, the apparatus further comprises:

a transmission determination module 1402 configured to determine according to a predefined transmission mode or dynamically determine whether to transmit the repetitively-transmitted system information within the system information scheduling period.

Preferably, the apparatus further comprises:

a predefining module 1403 configured to, within a frame number transmission period, predefine repetitively transmitting system information within one or more system information scheduling periods as the predefined transmission mode.

Preferably, the apparatus further comprises:

a transmission execution module 1404 configured to, when determining to transmit the repetitively-transmitted system information within a current system information scheduling period, perform coding, rate matching, scrambling and modulation on the system information, and map the system information obtained after the coding, rate matching, scrambling and modulation to available resource elements of the system information repetition transmission resource area within the system information scheduling period to transmit.

The apparatus for transmitting system information as shown in FIG. 14 can be integrated in a base station through which corresponding functions are completed.

Figure 15:
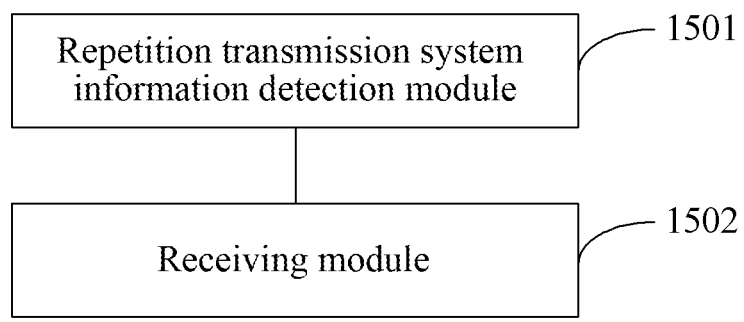
FIG. 15 is a structural schematic diagram of another apparatus for transmitting system information provided by embodiment 4 of the present document.

The embodiment of the present document further provides another apparatus for transmitting system information. A structure thereof is as shown in FIG. 15. The apparatus for transmitting system information comprises:

a repetition transmission system information detection module 1501 configured to detect system information within a system information scheduling period, wherein the system information is system information transmitted on a broadcast channel and system information transmitted on a system information repetition transmission resource area, the system information repetition transmission resource area comprises resource elements for repetitively transmitting the system information.

Preferably, the apparatus further comprises:

a receiving module 1502 configured to perform demodulation and descrambling on the system information transmitted on the system information repetition transmission resource area.

The apparatus for transmitting system information as shown in FIG. 15 can be integrated in a terminal through which corresponding functions are completed.

For flows of repetitively transmitting system information by using the base station as shown in FIG. 14 and the terminal as shown in FIG. 15, a reference can be made to the methods for transmitting system information provided by other embodiments of the present document, and thus no repetitive description is made here.

The embodiment of the present document further provides a computer program comprising program instructions, which, when executed by a base station, enable the base station to execute the method for transmitting system information.

The embodiment of the present document further provides a computer program comprising program instructions, which, when executed by a terminal, enable the terminal to execute the method for receiving system information.

The embodiment of the present document further provides a carrier carrying any one of the computer programs.

The embodiments of the present document provide a method and an apparatus for transmitting system information, wherein a base station determines a system information repetition transmission resource area within a system information scheduling period, the system information repetition transmission resource area comprises resource elements for repetitively transmitting the system information, and a terminal detects system information within the system information scheduling period. By configuring the resources for repetitively transmitting the system information, the repetitive transmission of the system information between the base station and the terminal is realized and the problem of how to guarantee the normal communication between the equipment and the base station is solved.

The technical solutions provided by the embodiments of the present document can guarantee that the terminal successfully accesses to a network under a TDD system by continuously trying to perform joint decoding on the system information transmitted on the broadcast channel and the system information repetition transmission resource.

One skilled in the art can understand that all or partial steps of the above-mentioned embodiments can be implemented by using a computer program flow, the computer program can be stored in a computer readable storage medium, the computer program is executed on corresponding hardware platforms (such as systems, equipment, apparatuses and devices), and during execution, one or a combination of the steps of the method embodiments is included.

Optionally, all or partial steps of the above-mentioned embodiments can also be implemented by using integrated circuits, and these steps can be respectively fabricated into integrated circuit modules, or a plurality of modules or steps thereof can be fabricated into a single integrated circuit module for implementation. Therefore, the present document is not limited to any specific combination of hardware and software.

Each apparatus/function module/function unit in the above-mentioned embodiments can also be implemented by adopting general computing devices, can be integrated on a single computing device and can also be distributed in a network consisting of a plurality of computing devices.

When each apparatus/function module/function unit in the above-mentioned embodiments is implemented in the form of software function module and is sold or used as an independent product, each apparatus/function module/function unit can be stored in a computer readable storage medium. The above-mentioned computer readable storage medium can be a read only memory, a magnetic disk, a compact disk or the like.

Any one skilled in the art can easily conceive variation or replacement within the technical range disclosed by the present document, but the variation or replacement shall also be included in the protection range of the present document. Therefore, the protection range of the present document shall be subjected to the protection range of claims.

INDUSTRIAL APPLICABILITY

The embodiments of the present document realize the repetitively transmitting of the system information between the base station and the terminal and solve the problem of how to guarantee the normal communication between the equipment and the base station.

What is claimed is:

1. A method for transmitting system information, comprising:
    determining a system information repetition transmission resource area within a system information scheduling period, wherein the system information repetition transmission resource area comprises resource elements for repetitively transmitting system information;
    determining a mapping mode according to whether the system information repetition transmission resource contains Cell-specific Reference Signals (CRSs);
    mapping the system information to available resource elements of the system information repetition transmission resource area within a system information scheduling period to transmit; and
    transmitting the system information to a terminal.

2. The method for transmitting system information according to claim 1, wherein, within a system information scheduling period, sub-frame resources corresponding to the system information repetition transmission resource area within the system information scheduling period are configured according to any one or more of follows:
    the system information repetition transmission resource area being on sub-frame 0 of a radio frame;
    the system information repetition transmission resource area being on sub-frame 0 of a radio frame and sub-frame 5 of a radio frame with an odd system frame number; and
    the system information repetition transmission resource area being on sub-frame 0 of a radio frame and N other sub-frames of the radio frame, N≥1 and N<10.

3. The method for transmitting system information according to claim 1, wherein,
    the system information repetition transmission resource area consists of one or more system information repetition transmission resource area blocks, one system information repetition transmission resource area block consists of M continuous OFDM (Orthogonal Frequency Division Multiplexing) symbols in time domain and comprises 72 subcarriers in frequency domain, M≥1 and M≤7.

4. The method for transmitting system information according to claim 1, wherein,
    the system information repetition transmission resource area does not comprise resource areas occupied by a physical downlink control channel and broadcast channel and a synchronizing signal within a sub-frame, wherein the resource area occupied by the physical downlink control channel is on first four OFDM symbols, or first three OFDM symbols or first two OFDM symbols of a sub-frame.

5. The method for transmitting system information according to claim 1, wherein, after the step of determining a system information repetition transmission resource area within a system information scheduling period, the method further comprises:
    a base station determining according to a predefined transmission mode or dynamically determining whether to transmit the repetitively-transmitted system information within the system information scheduling period.

6. The method for transmitting system information according to claim 4, wherein the method further comprises:

within a frame number transmission period, predefining repetitively transmitting system information within one or more system information scheduling periods as the predefined transmission mode.

7. The method for transmitting system information according to claim 1, wherein mapping the system information to available resource elements of the system information repetition transmission resource area within a system information scheduling period to transmit comprises:
mapping a system information coding block transmitted on a broadcast channel to the system information repetition transmission resource area to transmit.

8. The method for transmitting system information according to claim 1, wherein determining a mapping mode according to whether the system information repetition transmission resource contains CRSs comprises:
selecting and mapping system information coding blocks transmitted on broadcast channel resource symbols not containing the CRSs to resource elements corresponding to symbols not containing the CRSs in the system information repetition transmission resource area blocks.

9. The method for transmitting system information according to claim 1, wherein the available resource elements of the system information repetition transmission resource area refer to resource elements except resource elements for transmitting Cell-specific Reference Signals (CRSs) in the system information repetition transmission resource area.

10. The method for transmitting system information according to claim 1, wherein the system information refers to Master Information Block (MIB) or Advanced Master Information Block (Advanced-MIB) plus Cyclic Redundancy Check (CRC), wherein a length of the MIB is 24 bits and a length of the CRC is 16 bits.

11. The method for transmitting system information according to claim 1, wherein the method further comprises:
when determining to transmit the repetitively-transmitted system information within a current system information scheduling period, performing coding, rate matching, scrambling and modulation on the system information.

12. The method for transmitting system information according to claim 1, wherein,
the coding, rate matching, scrambling, modulation and mapping are performed within one system information scheduling period.

13. The method for transmitting system information according to claim 12, wherein performing coding, rate matching, scrambling and modulation on the system information, and mapping the system information obtained after the coding, rate matching, scrambling and modulation to available resource elements of the system information repetition transmission resource area within the system information scheduling period to transmit comprises:
determining a coding bit length of the repetitively-transmitted system information after rate matching according to a total number of available resource elements in all system information repetition transmission resource areas within the system information scheduling period, and performing coding on the repetitively-transmitted system information;
performing rate matching on the repetitively-transmitted system information after coding;
performing scrambling and modulation on the repetitively-transmitted system information after rate matching, wherein a scrambling length is equal to the coding bit length of the repetitively-transmitted system information after rate matching; and
mapping the repetitively-transmitted system information after modulation to available resource elements in all system information repetition transmission resource areas within the system information scheduling period.

14. The method for transmitting system information according to claim 13, wherein mapping the repetitively-transmitted system information after modulation to available resource elements in all system information repetition transmission resource areas within the system information scheduling period comprises:
firstly mapping the repetitively-transmitted system information after modulation to all available resource elements corresponding to a first symbol in a first repetition transmission resource area within the system information scheduling period according to a sequence of first frequency domain and then time domain, and then sequentially mapping the repetitively-transmitted system information after modulation to all available resource elements corresponding to a next symbol in the first repetition transmission resource area till mapping to all repetition transmission resource areas is completed.

15. The method for transmitting system information according to claim 1, wherein,
said coding, rate matching, scrambling, modulation and mapping are performed within one radio frame of the system information scheduling period.

16. The method for transmitting system information according to claim 15, wherein performing coding, rate matching, scrambling and modulation on the system information, and mapping the system information obtained after the coding, rate matching, scrambling and modulation to available resource elements of the system information repetition transmission resource area within the system information scheduling period to transmit comprises:
determining a coding bit length of the repetitively-transmitted system information after rate matching within the radio frame according to a total number of available resource elements in all system information repetition transmission resource area blocks within each radio frame, and performing coding on the repetitively-transmitted system information;
performing rate matching on the repetitively-transmitted system information after coding;
performing scrambling and modulation on the repetitively-transmitted system information after rate matching, wherein a scrambling length is equal to the coding bit length of the repetitively-transmitted system information after rate matching within the radio frame; and
within a radio frame, mapping the repetitively-transmitted system information after modulation to available resource elements in all system information repetition transmission resource area blocks within the current radio frame to transmit.

17. The method for transmitting system information according to claim 16, wherein, within a radio frame, mapping the repetitively-transmitted system information after modulation to available resource elements in all system information repetition transmission resource area blocks within the current radio frame to transmit comprises:
firstly mapping the repetitively-transmitted system information after modulation to all available resource elements corresponding to a first symbol in a first repetition transmission resource area block within the radio frame according to a sequence of first frequency domain and then time domain, and then sequentially mapping the repetitively-transmitted system information after modulation to all available resource elements corresponding to a next symbol in the first repetition transmission resource area till mapping to all repetition transmission resource areas is completed.

18. A method for receiving system information, comprising:
   detecting system information within a system information scheduling period by a terminal, wherein the system information is system information transmitted on a broadcast channel and system information transmitted on a system information repetition transmission resource area, the system information repetition transmission resource area comprises resource elements for repetitively transmitting the system information;
   wherein, the system information is mapped to available resource elements of the system information repetition transmission resource area within a system information scheduling period to transmit according to a mapping mode; and
   wherein the mapping mode is determined according to whether the system information repetition transmission resource contains Cell-specific Reference Signals (CRSs).

19. The method for receiving system information according to claim 18, wherein within a system information scheduling period, sub-frame resources corresponding to the system information repetition transmission resource area within the system information scheduling period are configured according to any one or more of follows:
   the system information repetition transmission resource area being on sub-frame 0 of a radio frame;
   the system information repetition transmission resource area being on sub-frame 0 of a radio frame and sub-frame 5 of a radio frame with an odd system frame number; and
   the system information repetition transmission resource area being on sub-frame 0 of a radio frame and N other sub-frames of the radio frame, N≥1 and N<10;
   wherein,
   the system information repetition transmission resource area consists of one or more system information repetition transmission resource area blocks, one system information repetition transmission resource area block consists of M continuous Orthogonal Frequency Division Multiplexing (OFDM) symbols in time domain and comprises 72 subcarriers in frequency domain, M≥1 and M≤7;
   wherein,
   the system information repetition transmission resource area does not comprise resource areas occupied by a physical downlink control channel and broadcast channel and a synchronizing signal within a sub-frame, wherein the resource area occupied by the physical downlink control channel is on first four OFDM symbols, or first three OFDM symbols or first two OFDM symbols of a sub-frame;
   wherein,
   available resource elements of the system information repetition transmission resource area refer to resource elements except resource elements for transmitting Cell-specific Reference Signals (CRSs) in the system information repetition transmission resource area.

20. The method for receiving system information according to claim 18, wherein the system information refers to Master Information Block (MIB) or Advanced Master Information Block (Advanced-MIB) plus Cyclic Redundancy Check (CRC), wherein a length of the MIB is 24 bits and a length of the CRC is 16 bits.

21. The method for receiving system information according to claim 18, wherein, the step of a terminal detecting system information within a system information scheduling period further comprises that:
   the terminal performs demodulation and descrambling on the system information transmitted on the system information repetition transmission resource area by using one system information scheduling period as a unit,
   or,
   the terminal performs demodulation and descrambling on the system information transmitted on the system information repetition transmission resource area within a single radio frame by using one radio frame period as a unit,
   or,
   the terminal performs demodulation and descrambling on the repetitively-transmitted system information received on symbols in the system information repetition transmission resource area, at this moment, the repetitively-transmitted system information received on the system information repetition transmission resource area comes from a system information coding block transmitted on a broadcast channel, wherein the repetitively-transmitted system information received on resource elements corresponding to symbols containing CRSs in the system information repetition transmission resource area blocks is the same as system information coding block information received on at least one broadcast channel resource symbol containing the CRSs, and the repetitively-transmitted system information received on resource elements corresponding to symbols not containing the CRSs in the system information repetition transmission resource area blocks is the same as system information coding block information received on at least one broadcast channel resource symbol not containing the CRSs.

22. The method for receiving system information according to claim 21, wherein the step the terminal performing demodulation and descrambling on the system information transmitted on the system information repetition transmission resource area comprises:
   determining a coding bit length and performing demodulation on the repetitively-transmitted system information, wherein the coding bit length of the repetitively-transmitted system information is determined according to a total number of available resource elements in all system information repetition transmission resource areas within one system information scheduling period; and
   performing descrambling on the repetitively-transmitted system information after demodulation, wherein a scrambling length is equal to the coding bit length of the repetitively-transmitted system information after rate matching.

23. The method for receiving system information according to claim or 21, wherein,
   the terminal performing demodulation and descrambling on the system information transmitted on the system information repetition transmission resource area within a single radio frame by using one radio frame period as a unit comprises:
   determining a coding bit length and performing demodulation on the repetitively-transmitted system information, wherein the coding bit length of the repetitively-transmitted system information is determined according to a total number of available resource elements in all system information repetition transmission resource areas within one radio frame; and performing descrambling on the repetitively-transmitted system information after demodulation, wherein a scrambling length is equal to the coding bit length of the repetitively-transmitted system information after rate matching.

24. The method for receiving system information according to claim 21, wherein the terminal performing demodulation and descrambling on the system information transmitted on the system information repetition transmission resource area comprises:

the terminal performing demodulation and descrambling on the repetitively-transmitted system information received on symbols in the system information repetition transmission resource area, at this moment, the repetitively-transmitted system information received on the system information repetition transmission resource area coming from a system information coding block transmitted on a broadcast channel, wherein the repetitively-transmitted system information received on resource elements corresponding to symbols containing CRSs in the system information repetition transmission resource area blocks is the same as system information coding block information received on at least one broadcast channel resource symbol containing the CRSs, and the repetitively-transmitted system information received on resource elements corresponding to symbols not containing the CRSs in the system information repetition transmission resource area blocks is the same as system information coding block information received on at least one broadcast channel resource symbol not containing the CRSs.

25. The method for receiving system information according to claim 21, wherein, after the step of the terminal performing demodulation and descrambling on the system information transmitted on the system information repetition transmission resource area, the method further comprises:

the terminal performing joint decoding on the system information received on the broadcast channel and the system information received on the system information repetition transmission resource area.

26. The method of transmitting system information according to claim 1, wherein determining a mapping mode according to whether the system information repetition transmission resource contains CRSs comprises:

selecting and mapping system information coding blocks transmitted on broadcast channel resource symbols containing the CRSs to resource elements corresponding to symbols containing the CRSs in the system information repetition transmission resource area blocks.

* * * * *